US011442590B2

(12) United States Patent
Van Der Walt et al.

(10) Patent No.: US 11,442,590 B2
(45) Date of Patent: *Sep. 13, 2022

(54) INTUITIVE GUI FOR CREATING AND MANAGING HOSTS AND VIRTUAL MACHINES

(71) Applicant: VMware, Inc., Palo Alto, CA (US)

(72) Inventors: Mornay Van Der Walt, Los Gatos, CA (US); Dave Shanley, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/073,981

(22) Filed: Oct. 19, 2020

(65) Prior Publication Data
US 2021/0141496 A1 May 13, 2021

Related U.S. Application Data

(62) Division of application No. 14/230,697, filed on Mar. 31, 2014, now Pat. No. 10,809,866.
(Continued)

(51) Int. Cl.
G06F 3/0481 (2022.01)
H04L 41/0803 (2022.01)
H04L 67/10 (2022.01)
G06F 9/455 (2018.01)
H04L 41/50 (2022.01)
H04L 67/1097 (2022.01)
G06F 3/04842 (2022.01)
(Continued)

(52) U.S. Cl.
CPC ........ G06F 3/0481 (2013.01); G06F 3/04842 (2013.01); G06F 9/45558 (2013.01); H04L 41/0803 (2013.01); H04L 41/22 (2013.01); H04L 41/50 (2013.01); H04L 67/10 (2013.01); H04L 67/1097 (2013.01); G06F 3/0608 (2013.01); G06F 9/45533 (2013.01); G06F 2009/45562 (2013.01)

(58) Field of Classification Search
CPC .. G06F 3/0481; G06F 9/45558; G06F 3/0608; H04L 41/0803; H04L 67/10
See application file for complete search history.

(56) References Cited

U.S. PATENT DOCUMENTS 6,823,508 B1 11/2004 Burkhardt et al.
6,873,602 B1 3/2005 Ambe
(Continued)

OTHER PUBLICATIONS

"HP Cluster Management Utility V5.0 User Guide," HP Part No. 5900-1275 Edition 1, Nov. 2010.
(Continued)

Primary Examiner — Anil K Bhargava

(57) ABSTRACT

In a computer-implemented method for configuring an appliance in a virtualization infrastructure via a graphical user-interface a list of hosts and a centralized management tool of the virtualization infrastructure is displayed via the graphical user-interface. The hosts are for hosting one or more virtual machines. The centralized management tool is for centrally managing the virtualization infrastructure. In response to selecting one of the hosts, displaying host configuration properties associated with the selected hosts via the graphical user-interface. The host configuration properties are associated with a displayed user input field.

9 Claims, 33 Drawing Sheets

Related U.S. Application Data

(60) Provisional application No. 61/922,470, filed on Dec. 31, 2013.

(51) Int. Cl.
    *H04L 41/22* (2022.01)
    *G06F 3/06* (2006.01)

(56) References Cited

U.S. PATENT DOCUMENTS

| | | | |
|---|---|---|---|
| 7,577,722 | B1 | 8/2009 | Khandekar et al. |
| 7,620,984 | B2 | 11/2009 | Kallahalla et al. |
| 7,941,510 | B1 | 5/2011 | Tormasov et al. |
| 8,095,928 | B2 | 1/2012 | Kallahalla et al. |
| 8,484,355 | B1 | 7/2013 | Lockhead et al. |
| 9,015,121 | B1 | 4/2015 | Salamon et al. |
| 9,081,594 | B1 | 7/2015 | Labonte et al. |
| 10,152,346 | B2* | 12/2018 | Bogner .............. G06F 9/45558 |
| 10,771,351 | B2* | 9/2020 | Douglas .............. H04L 41/5096 |
| 10,970,102 | B2* | 4/2021 | Bogner .............. H04L 9/32 |
| 2004/0012600 | A1 | 1/2004 | Deering et al. |
| 2005/0268238 | A1 | 12/2005 | Quang et al. |
| 2006/0120411 | A1 | 6/2006 | Basu et al. |
| 2007/0283286 | A1 | 12/2007 | Ashok et al. |
| 2008/0083040 | A1 | 4/2008 | Dani et al. |
| 2008/0115141 | A1 | 5/2008 | Welingkar et al. |
| 2008/0172716 | A1 | 7/2008 | Talpade et al. |
| 2009/0288084 | A1* | 11/2009 | Astete .............. G06Q 30/0603 718/1 |
| 2009/0300593 | A1 | 12/2009 | Faus et al. |
| 2009/0300600 | A1 | 12/2009 | Sugai |
| 2009/0327211 | A1 | 12/2009 | McCune et al. |
| 2009/0328056 | A1 | 12/2009 | McCune et al. |
| 2010/0050171 | A1 | 2/2010 | Liang et al. |
| 2010/0100879 | A1 | 4/2010 | Katiyar |
| 2010/0180206 | A1 | 7/2010 | Silva et al. |
| 2010/0250785 | A1 | 9/2010 | Shin et al. |
| 2010/0313200 | A1* | 12/2010 | Rozee .............. G06F 9/45537 718/1 |
| 2010/0332637 | A1 | 12/2010 | Doi et al. |
| 2010/0333212 | A1 | 12/2010 | Carpenter et al. |
| 2011/0022694 | A1* | 1/2011 | Dalal .............. H04L 41/0856 709/222 |
| 2011/0055824 | A1 | 3/2011 | Benari |
| 2011/0173608 | A1 | 7/2011 | Buragohain et al. |
| 2011/0173609 | A1 | 7/2011 | Buragohain et al. |
| 2011/0185355 | A1* | 7/2011 | Chawla .............. G06F 9/5077 718/1 |
| 2011/0209145 | A1 | 8/2011 | Chen et al. |
| 2011/0243329 | A1 | 10/2011 | Staehly |
| 2011/0258082 | A1 | 10/2011 | Schmieder et al. |
| 2011/0276963 | A1 | 11/2011 | Wu et al. |
| 2011/0296429 | A1 | 12/2011 | Segmuller et al. |
| 2012/0030673 | A1 | 2/2012 | Sakamoto |
| 2012/0042034 | A1 | 2/2012 | Goggin et al. |
| 2012/0072581 | A1 | 3/2012 | Tung et al. |
| 2012/0072910 | A1* | 3/2012 | Martin .............. G06F 9/45533 718/1 |
| 2012/0124211 | A1 | 5/2012 | Kampas et al. |
| 2012/0166621 | A1 | 6/2012 | Sharma et al. |
| 2012/0216135 | A1* | 8/2012 | Wong .............. G06F 9/45508 715/764 |
| 2012/0317498 | A1 | 12/2012 | Logan et al. |
| 2013/0042003 | A1 | 2/2013 | Franco et al. |
| 2013/0046892 | A1 | 2/2013 | Otani |
| 2013/0067598 | A1 | 3/2013 | Da Palma |
| 2013/0073702 | A1 | 3/2013 | Umbehocker |
| 2013/0080641 | A1 | 3/2013 | Lui et al. |
| 2013/0104125 | A1 | 4/2013 | Sarma et al. |
| 2013/0111474 | A1* | 5/2013 | Agarwal .............. G06F 9/45558 718/1 |
| 2013/0145367 | A1 | 6/2013 | Moss et al. |
| 2013/0198384 | A1 | 8/2013 | Kirsch et al. |
| 2013/0311989 | A1 | 11/2013 | Ota et al. |
| 2013/0332610 | A1* | 12/2013 | Beveridge .............. G06F 9/45558 709/226 |
| 2014/0068718 | A1 | 3/2014 | Mureinik |
| 2014/0119727 | A1 | 5/2014 | Ousley et al. |
| 2014/0149793 | A1 | 5/2014 | Zaslavsky et al. |
| 2014/0149983 | A1 | 5/2014 | Bonilla et al. |
| 2014/0365622 | A1 | 12/2014 | Iyengar et al. |
| 2014/0372178 | A1 | 12/2014 | Hsieh et al. |
| 2015/0026343 | A1 | 1/2015 | Borges et al. |
| 2015/0058555 | A1 | 2/2015 | Karamanolis et al. |
| 2015/0100696 | A1 | 4/2015 | Lee et al. |
| 2015/0180714 | A1 | 6/2015 | Chunn et al. |

OTHER PUBLICATIONS

"HP Insight Cluster Management Utility V7.0 User Guide," HP Part No. 5900-1627 Edition 1, Mar. 2012.

"HP Insight CMU," Rev. 3, Jun. 2012.

"IBM SmartCloud Entry User Guide," Version 2.3, Second Edition, Apr. 2012.

"KVM: A Hypervisor Whose Time Has Come", Scale Computing, http://www.scalecomputing.com/files/documentation/whitepaper-kvm-ibm.pdf, 2012, 4 pgs.

Jones, "Managing VMs with the Virtual Machine Manager," www.ibm.com/developerworks/, Oct. 31, 2012.

O'Brien et al., "System Configuration for a Multiple Node Computer System," IP.com No. IPCOM000043767D, Technical Disclosure Bulletin, 09-84, pp. 2541-2546, Sep. 1, 1984.

Zimman et al., "VMworld 2011 Hands-On Labs: Implementation and Workflow," pp. 70-76, in VMware Technical Journal (VMTJ), v. 1, n. 1, Apr. 2012.

"Hyperconvergence for Virtualization", Scale Computing, Nov. 11, 2013, publication date as evidenced on The Wayback Machine by archive.org at, https://web.archive.org/web/20131111204614/http://www.scalecomputing.com/files/documentation/hc3-whitepaper-hyperconvergence.pdf, 4 pgs.

Boles, "HyperConvergence: Next Generation Virtualization", http://www.infostor.com/storage-management/hyperconvergence-next-generation-virtualization.html, Oct. 17, 2012, 3 pgs.

Campbell, et al., "HP Converged Infrastructure for Dummies", 2012, 100 pgs.

Duan, et al., "A Survey on Service-Oriented Network Virtualization Toward Convergence of Networking and Cloud Computing", [Retrieved on Nov. 17, 2016]. Retrieved from the internet: <URL: http://s3.amazonaws.com/academia.edu.documents/38658448/TNSM-2012-00310-Final.pdf>, 2012, 20 pages (1-20).

Kleyman, "Hypervisor 101: Understanding the Virtualization Market", http://www.datacenterknowledge.com/archives/2012/08/01/hypervisor-101-a-look-hypervisor-market, Aug. 1, 2012, 6 pgs.

Lowe, "CIOs: Pay Attention to the Growing Trends of Commoditization and Hyper-convergence", [Retrieved on Jul. 16, 2015]. Retrieved from the internet: ,<URL: http://wikibon.org/wiki/v/CIOs:_Pay_Attention_To_The_Growing_Trends_Of_Commoditization_And_Hyper-convergence> 8 Pages (1-8)., Dec. 5, 2012, 8 pgs.

Marks, "The Hyperconverged Infrastructure", http://www.networkcomputing.com/storage/hyperconverged-infrastructure/1943627197, Sep. 7, 2012, 4 pgs.

Rings, et al., "Grid and Cloud Comuting: Opportunities for Integration with the Next Generation Network", [Retrieved on Nov. 17, 2016]. Retrieved from the internet: <URL:http://download.springer.com/static/pdf/562/art%253A10.1007%252Fs10723-009-9132-5.pdf>, 2009, 19 Pages (375-393).

* cited by examiner

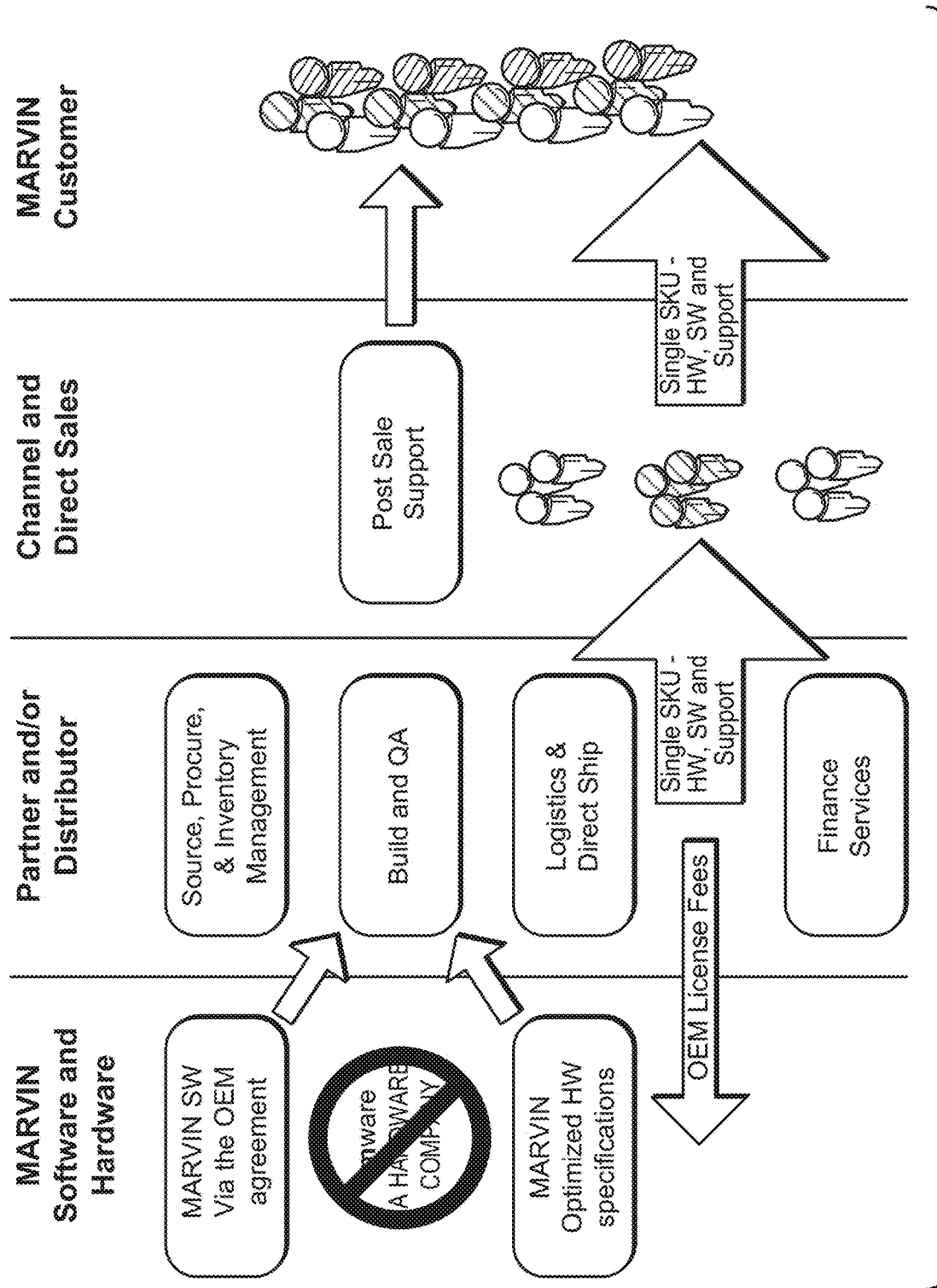

INTUITIVE GUI FOR CREATING AND MANAGING HOSTS AND VIRTUAL MACHINES

RELATED APPLICATIONS

This application is a divisional application of and claims priority to and the benefit of co-pending U.S. application Ser. No. 14/230,697, filed on Mar. 31, 2014, entitled "INTUITIVE GUI FOR CREATING AND MANAGING HOSTS AND VIRTUAL MACHINES," by Van Der Walt et al., and assigned to the assignee of the present application.

The application having U.S. application Ser. No. 14/230,697 claims priority to and benefit of then U.S. Application No. 61/922,470, filed on Dec. 31, 2013, entitled "INTUITIVE GUI FOR CREATING AND MANAGING ESX HOSTS AND VIRTUAL MACHINES," by Van Der Walt et al., and assigned to the assignee of the present application.

BACKGROUND

In conventional virtual computing environments, creating and managing hosts (e.g., ESX hosts) and virtual machines may be complex and cumbersome. Oftentimes, a user, such as an IT administrator, requires a high level and complex skill set to effectively create and manage the virtual machines.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 36 depicts a flow diagram for a method for creating and managing appliances and virtual machines via a graphical user-interface, according to various embodiments.

DETAILED DESCRIPTION OF CERTAIN EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Embodiments of a Virtual Computing Environment

Figure 1:
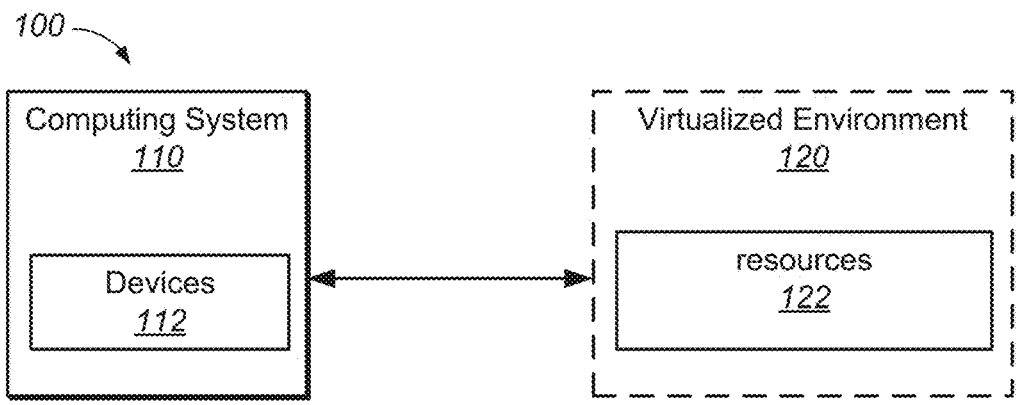
FIG. 1 depicts a block diagram of a virtual computing environment, according to various embodiments.

FIG. 1 depicts a block diagram that illustrates virtual computing environment (VCE) 100 (or virtualization infrastructure) that includes computing system 110 and virtualized environment 120, according to various embodiments. In general, computing system 110 and virtualized environment 120 are communicatively coupled over a network such that computing system 110 may access functionality of virtualized environment 120.

As will be described in further detail below, computing system 110 is implemented using virtualized environment 120. Also, while implementing the business functionality, computing system 110 might use some of resources 122.

In one embodiment, computing system 110 may be a system (e.g., enterprise system) or network that includes a combination of computer hardware and software. The corporation or enterprise utilizes the combination of hardware and software to organize and run its operations. To do this, system 110 uses resources 122 because system 110 typically does not have dedicated resources that can be given to the virtualized environment. For example, an enterprise system may provide various computing resource for various needs such as, but not limited to information technology (IT), security, email, etc.

In various embodiments, computing system 110 includes a plurality of devices 112. The devices are any number of physical and/or virtual machines. For example, in one embodiment, computing system 110 is a corporate computing environment that includes tens of thousands of physical and/or virtual machines. It is understood that a virtual machine is implemented in virtualized environment 120 that includes one or some combination of physical computing machines. Virtualized environment 120 provides resources 122, such as storage, memory, servers, CPUs, network switches, etc., that are the underlying hardware infrastructure for VCE 100.

The physical and/or virtual machines include a variety of applications (e.g., operating system, word processing, etc.). The physical and/or virtual machines may have the same installed applications or may have different installed applications or software. The installed software may be one or more software applications from one or more vendors.

Each virtual machine may include a guest operating system and a guest file system.

Moreover, the virtual machines may be logically grouped. That is, a subset of virtual machines may be grouped together in a container (e.g., VMware vApp™). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another. Also, the container of virtual machines and/or individual virtual machines may be controlled by a virtual management system. The virtualization infrastructure may also include a plurality of virtual datacenters. In general, a virtual datacenter is an abstract pool of resources (e.g., memory, CPU, storage). It is understood that a virtual data center is implemented on one or some combination of physical machines.

In various embodiments, computing system 110 may be a cloud environment, built upon a virtualized environment 120. Computing system 110 may be located in an Internet connected datacenter or a private cloud computing center coupled with one or more public and/or private networks. Computing system 110, in one embodiment, typically couples with a virtual or physical entity in a computing environment through a network connection which may be a public network connection, private network connection, or some combination thereof. For example, a user may couple via an Internet connection with computing system 110 by accessing a web page or application presented by computing system 110 at a virtual or physical entity.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESX™ hypervisor, a VMware ESXi™ hypervisor, etc.) For example, if hypervisor is a VMware ESX™ hypervisor, then virtual functionality of the host is considered a VMware ESX™ server.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Additional details regarding embodiments of structure and functionality of a host computer system are provided with respect to FIG. 2.

During use, the virtual machines perform various workloads. For example, the virtual machines perform the workloads based on executing various applications. The virtual machines can perform various workloads separately and/or in combination with one another.

Example Host Computer System

Figure 2:
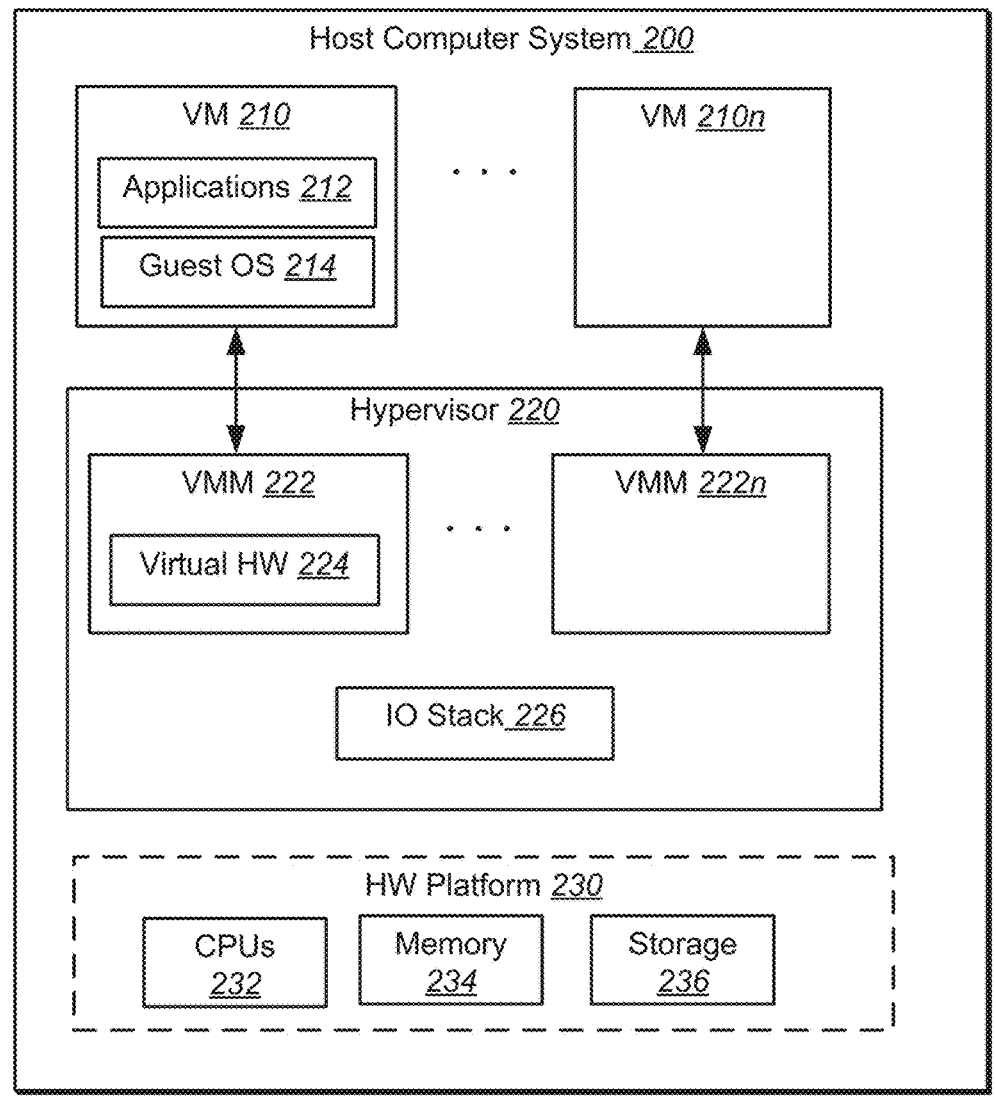
FIG. 2 depicts a block diagram of a host computing system, according to various embodiments.

FIG. 2 is a schematic diagram that illustrates a virtualized computer system that is configured to carry out one or more embodiments of the present invention. The virtualized computer system is implemented in a host computer system 200 including hardware platform 230. In one embodiment, host computer system 200 is constructed on a conventional, typically server-class, hardware platform.

Hardware platform 230 includes one or more central processing units (CPUs) 232, system memory 234, and storage 236. Hardware platform 230 may also include one or more network interface controllers (NICs) that connect host computer system 200 to a network, and one or more host bus adapters (HBAs) that connect host computer system 200 to a persistent storage unit.

Hypervisor 220 is installed on top of hardware platform 230 and supports a virtual machine execution space within which one or more virtual machines (VMs) 210 and 210n may be concurrently instantiated and executed. Each virtual machine implements a virtual hardware platform that supports the installation of a guest operating system (OS) which is capable of executing applications. For example, virtual hardware 224 for virtual machine 210 supports the installation of guest OS 214 which is capable of executing applications 212 within virtual machine 210.

Guest OS 214 may be any of the well-known commodity operating systems, and includes a native file system layer, for example, either an NTFS or an ext3FS type file system layer. IOs issued by guest OS 214 through the native file system layer appear to guest OS 214 as being routed to one or more virtual disks provisioned for virtual machine 210 for final execution, but such IOs are, in reality, are reprocessed by IO stack 226 of hypervisor 220 and the reprocessed IOs are issued, for example, through an HBA to a storage system.

Virtual machine monitor (VMM) 222 and 222n may be considered separate virtualization components between the virtual machines and hypervisor 220 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Examples of an Appliance

Figure 3:
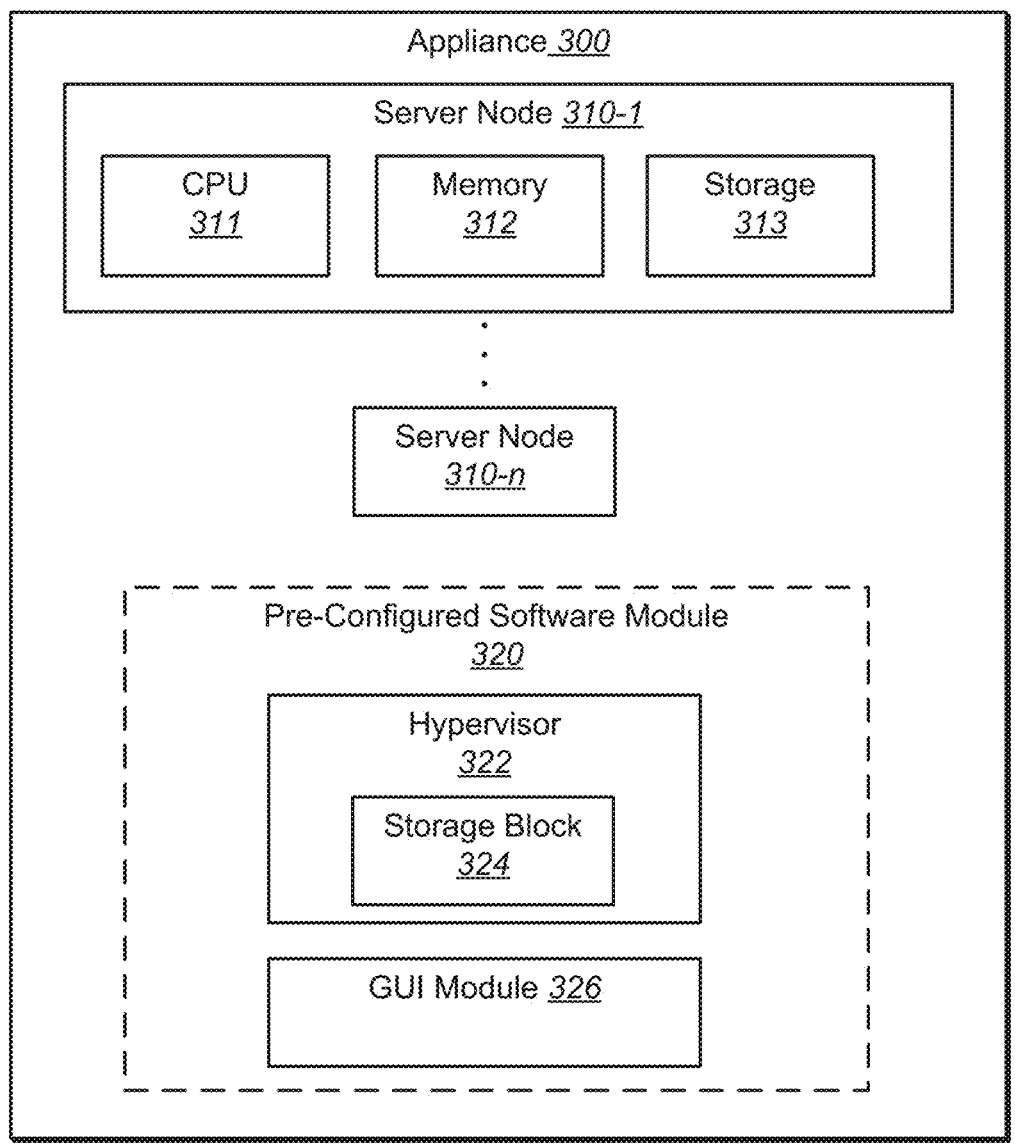
FIG. 3 depicts a block diagram of an appliance, according to various embodiments.

FIG. 3 depicts an embodiment of appliance 300. Appliance 300 is a computing device that includes the requisite physical hardware and software to create and manage a virtualization infrastructure. Appliance 300 is also referred to herein as a pre-configured hyper-converged computing device. In general, a hyper-converged computing device includes pretested, preconfigured and pre-integrated storage, server and network components, including software, that are located in an enclosure. Moreover, the hyper-converged computing device includes a hypervisor that supports a virtualization infrastructure.

Based on the pre-configured hardware and software disposed within appliance 300, appliance 300 enables a user to simply and quickly create a virtualization infrastructure and deploy virtual machines shortly after the appliance is powered on for the first time.

Appliance 300 includes, among other things, at least one server node. For example, server nodes 310-1 through server node 310-n. Server node 310-1 includes a central processing unit (CPU) 311, memory 312, and storage 313. It should be appreciated that other server nodes (i.e., server node 310-n) each include a CPU, memory, and storage similar to server node 310-n.

Appliance 300 supports a scale out architecture. For example, an appliance can include four server nodes. Multiple appliances can be scaled out to support the addition of more sever nodes—for example, in increments of four server nodes per appliance.

In one embodiment, appliance 300 is able to deploy a plurality of virtual machines in the virtualization infrastructure. For example, based on the hardware and software incorporated in appliance 300, appliance 300 is able to deploy a number of virtual machines (e.g., up to 75 virtual machines, up to 150 virtual machines, etc.).

Moreover, each server node may be considered a server or host computing system. That is, each server node is able to independently host a number of virtual machines. For example, server node 310-1 is able to host a first set of virtual machines, while other server nodes are each able to independently host other sets of virtual machines, respectively.

The server nodes are independent of one another, and are not required to share any functionality with one another. Appliance 300 does not include a backplane. As such, the server nodes are isolated from one another and therefore independent of one another.

CPU 311 may be, but is not limited to, a dual socket CPU (e.g., Intel Xeon™ CPUs, 4-core to 6-core).

Memory 312 may be, but is not limited to, 128 gigabytes (GB).

Storage may be, but is not limited to, four drive slots per server node. Such as a solid state drive (SSD) for read/write cache (e.g., an SSD up to 400 GB), and three hard disk drives (HDD) for the storage of virtual machines (e.g., HDDs up to 1.2 terabytes (TB) for a total of 3.6 TB).

Additionally, the appliance may include various external interfaces, such as but not limited to, serial, network RJ-45 or SFP+(10000 NIC), graphics, management RJ-45 (100/10000 NIC), power (in front and in rear), UID (in front and in rear) and a USB.

The appliance may also include Component Interconnect Express (PCIe) expansion slots, and a disk controller with pass through capabilities. It should be appreciated that the appliance may include other hardware attributes that are compatible with supporting a virtualization infrastructure.

In one embodiment, appliance 300 is a rackable 2U/4Node appliance. That is, appliance 300 is two rack units in height and includes four server nodes (e.g., server nodes 310-1 through 310-n).

The size of a piece of rack-mounted equipment is described as a number in "U" or "RU" (rack unit). One rack unit is often referred to as "1U", 2 rack units as "2U" and so on. "U" is a unit of measure that describes the height of equipment designed to mount in a rack (e.g., 19-inch rack or a 23-inch rack). The 19-inch (482.6 mm) or 23-inch (584.2 mm) dimension refers to the width of the equipment mounting frame in the rack including the frame. In some instances, one rack unit is 1.75 inches (4.445 cm) high.

In another embodiment, appliance 300 is a 4U/4Node appliance. That is, appliance 300 is four rack units in height and includes 4 server nodes (e.g., server nodes 310-1 through 310-n).

Appliance 300 includes software to support a virtualization infrastructure. That is, appliance 300 includes code or instructions stored on physical hardware in appliance 300, that when executed by a processor, supports a virtualization infrastructure. For instance, appliance 300 includes pre-configured software module 320.

It should be appreciated that the software installed on appliance 300 (e.g., software module 320) is stored in a storage device. In various embodiments, the software may be installed in a single server node or may be distributed in various server nodes. In another embodiment, the software may be stored in a storage device within appliance 300 but is outside of the server nodes.

During operation of the appliance, the software may be executed by one or more CPUs in a single server node or the execution may be distributed amongst various CPUs in various server nodes.

Software module 320 includes, among other things, hypervisor 322. As described above, a hypervisor is installed on top of hardware platform (e.g., CPU, memory and storage) and supports a virtual machine execution space within which one or more virtual machines (VMs) may be concurrently instantiated and executed.

In various embodiments, hypervisor 322 is VMware ESX™ hypervisor or a VMware ESXi™ hypervisor. It is noted that "ESX" is derived from the term "Elastic Sky X" coined by VMware™.

It should be appreciated that software module 320, in one embodiment, includes a suite of software to support virtualized computing (e.g., VMware vSphere™ VCenter™) that utilizes various components such as a VMware ESX/ESXi hypervisor.

Software module 320 includes storage block 324. Storage block 324 is a logical partition of storage (e.g., storage 313) in appliance 300. In other words, storage block 324 is virtual storage. In one embodiment, storage block 314 is a virtual storage area network (VSAN). As a result, the VSAN allows traffic to be isolated within specific portions of a storage area network.

Storage block 324 is imbedded or integral with hypervisor 322. In other words, the data path for storage is in the hypervisor layer.

Various advantages occur due to the storage block integrated with the hypervisor. In one example, the VSAN communicates with the ESX layer at a kernel level and is not required to communicate over a network via an Ethernet connection. As such, communication latency between the storage block and hypervisor is reduced.

GUI module 326 is code or instructions that enable the utilization of a graphical user interface to creating and managing appliances (e.g., ESX hosts) and virtual machines of the virtualization infrastructure. The graphical user interface is described in further detail below.

It is noted that software module 320 is proprietary software of a single entity (e.g., VMware™). For example, hypervisor 322, storage block 324, and GUI module 326 are proprietary software code to a single entity. That is, hypervisor 322, storage block 324, and GUI module 326 are not open source code, and therefore require a license agreement between the licensor (e.g., VMware™) and a purchaser of the appliance that includes the proprietary software module. In one embodiment, the license agreement is an end-user license agreement (EULA). The EULA establishes the purchaser's right to use the software (e.g., software module 320) and the hardware of appliance 300.

Figure 4A:
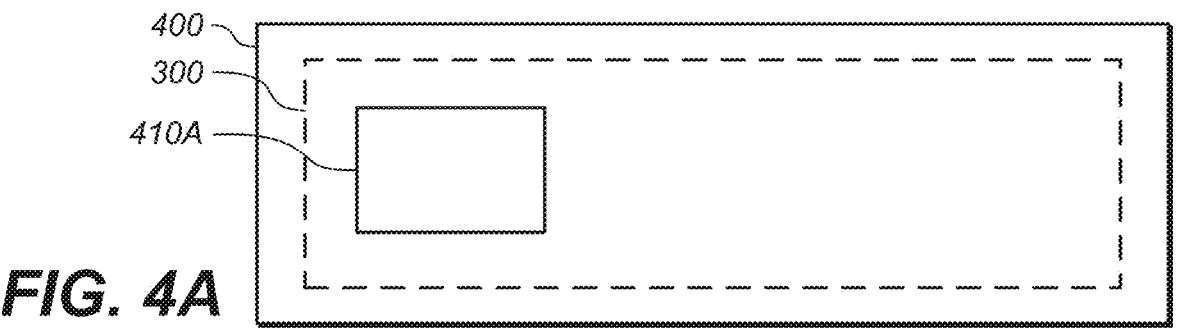
FIG. 4A depicts a block diagram of a side-view of an appliance offered for sale, according to various embodiments.

FIG. 4A depicts an embodiment of a side-view of an appliance offered for sale. In one embodiment, appliance 300 is offered for sale as a single stock keeping unit (SKU). For example, appliance 300 is disposed in packaging 400 and SKU 410A is on packaging 400. Accordingly, appliance 300 is offered for sale as a single SKU.

Figure 4B:
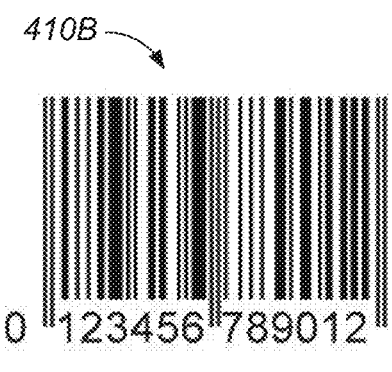
FIG. 4B depicts an embodiment of a SKU, according to various embodiments.

FIG. 4B depicts an example embodiment of SKU 410B.

More specifically, appliance 300, as described herein, is pre-configured with the requisite hardware and software for employing a virtualization infrastructure. Therefore, subsequent the purchase of appliance 300 as a single SKU, appliance 300 is not required to include any additional hardware and/or software to support and manage a virtualization infrastructure.

Upon powering on appliance 300 for the first time, a single EULA is displayed to an end-user. Because software module 320 is proprietary to a single entity (e.g., VMware™), only a single EULA, provided by the single entity, is displayed to the purchasing end-user. More specifically, at least hypervisor 322 (e.g., ESX/ESXi hypervisor) and storage block 324 (e.g., VSAN) are proprietary to a single entity (e.g., VMware™). Therefore, only a single EULA pertaining to hypervisor 322 and storage block 324 is displayed and provided to an end-user.

Upon acceptance of the EULA, appliance 300 is enabled to operate and manage a virtualization infrastructure, and deploy virtual machines in the virtualization infrastructure.

It should be appreciated that upon first powering on appliance 300 and accepting the single EULA, a virtualization infrastructure is able to be rapidly created and a virtual machine is able to be deployed within the virtualization infrastructure within minutes (e.g., 15 minutes). Moreover, the virtualization infrastructure is able to be managed and controlled by an end-user that is not required to have high-level IT administrative training and experience.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

Examples of a Virtualization Infrastructure

Figure 5:
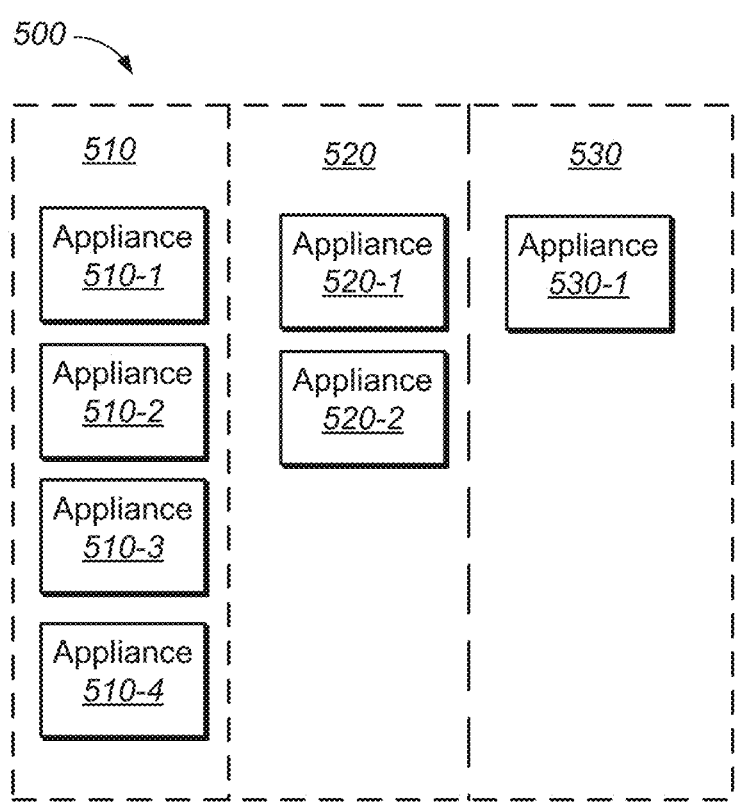
FIG. 5 depicts a block diagram of a virtualization infrastructure, according to various embodiments.

FIG. 5 depicts an embodiment of various appliances supporting virtualization infrastructure 500.

In one embodiment, appliances may be grouped together to increase the functionality of creating and managing a virtualization infrastructure. For example, appliance 510-1 was initially utilized to deploy a plurality of virtual machines, at location 510. However, additional virtual machines were desired but appliance 510-1, alone, was not able to meet the demand for the desired additional virtual machines. As such, additional appliances 510-2, 510-3, and 510-4 were purchased and grouped together to meet the demand of the additional virtual machines. In particular, this grouping of appliances which are communicatively coupled together, act as a single platform for managing the virtualization infrastructure and deploying virtual machines.

Similarly, appliance 520-1 was initially utilized to deploy a plurality of virtual machines, at location 520. However, additional virtual machines were desired but appliance 520-1, alone, was not able to meet the demand for the desired additional virtual machines. As such, additional appliance 520-2 was purchased and grouped together with appliance 520-1 to meet the demand of the additional virtual machines.

It should be appreciated that any number of appliances may be grouped together. For example, two, three, four, five or more appliances may be grouped together provided that the functionality of the appliances, as a whole, are able to act as a single platform for managing the virtualization infrastructure.

Additionally, the appliances and/or grouping of appliances may be located at various locations. For example, a first grouping of appliances may be located at a main office of an enterprise, while a second grouping of appliances are located at a remote office/branch office (ROBO).

In another example, virtualization infrastructure 500 is a virtualization infrastructure of a large enterprise having various building and infrastructure at various geo-locations. In such an example, information technology (IT) is located at a first location (e.g., location 510), an engineering team is located at a second location (e.g., location 520) and sales team is located at location 530.

Accordingly, appliances 510-1 through 510-4 may be grouped together at a first location 510 to support the demand for virtual machines of the IT team, appliances 510-1 and 510-2 are grouped together at location 520 to support the demand of virtual machines for the engineering team, and appliance 530-1 is located at location 530 to support the demand of virtual machines for the sales team.

As will be described in further detail below, GUI module 326 enables a GUI to facilitate the creating and managing of hosts and virtual machines. Moreover, the GUI is able to facilitate in managing the virtualization infrastructure by displaying the attributes of the appliances. For example, the GUI would display the particular health, resources used, and the like, for each of the appliances in virtualization infrastructure 500.

Examples of a Non-Perpetual/Term Based EULA

As described above, a single EULA is provided to the purchaser of appliance 300.

In various embodiments, the EULA is a non-perpetual EULA that pertains to appliance 300. In one embodiment, the EULA is a term license that covers the software and hardware in appliance 300. For example, the EULA is a non-perpetual/term based EULA that is a 36 month license.

At the end of the 36 months, an extension may be purchased. The extension may be, for example, a 12 month or 24 month extension.

It is noted that a support and service (SnS) is a part of the SKU for appliance 300. As such, the purchased extension of the term license of appliance 300 also includes an extension of the SnS.

Example Methods of Operation

Figure 6:
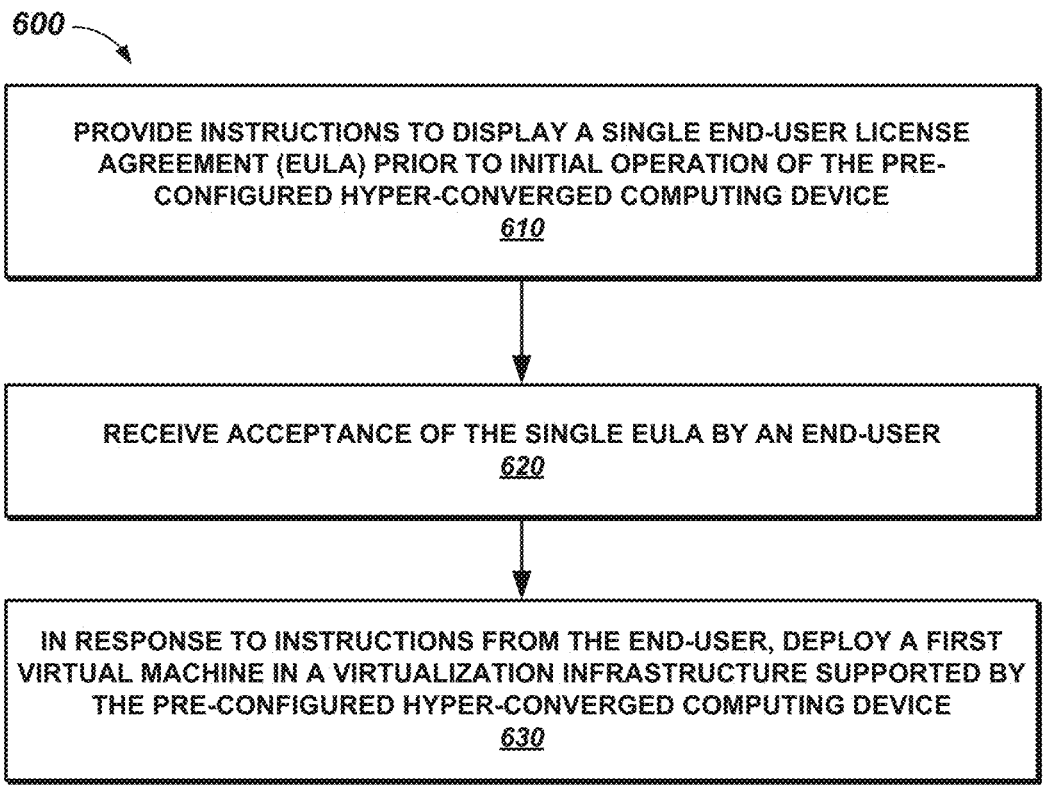
FIG. 6 depicts a flow diagram for a method for deploying a virtual machine via a pre-configured hyper-converged computing device, according to various embodiments.
Figure 7:
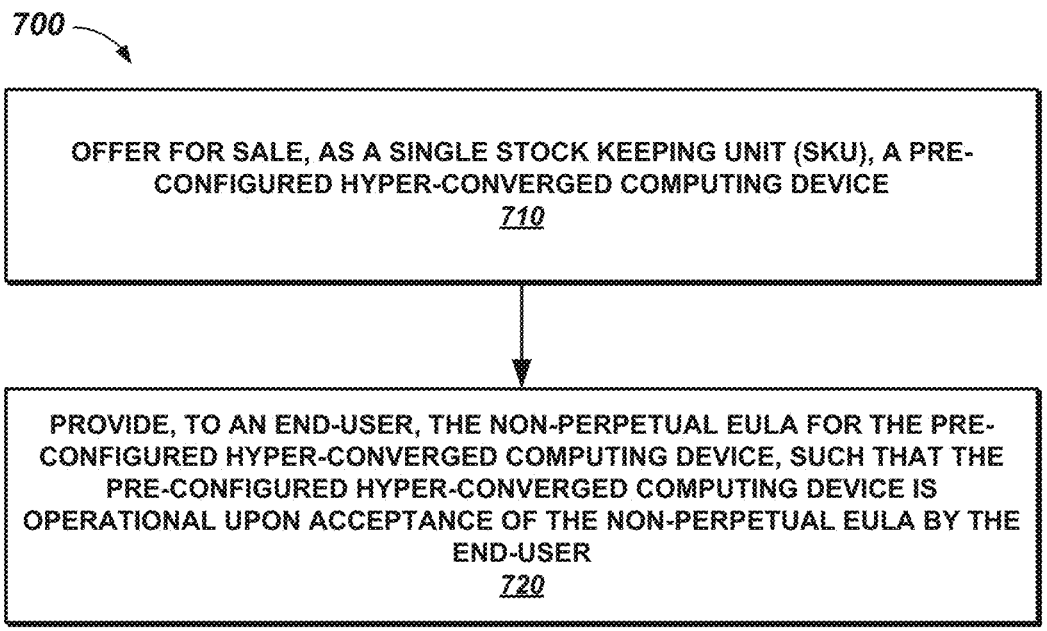
FIG. 7 depicts a flow diagram for a method for providing a non-perpetual end-user license agreement (EULA) for a pre-configured hyper-converged computing device that supports a virtualization infrastructure, according to various embodiments.

The following discussion sets forth in detail the operation of some example methods of operation of embodiments. With reference to FIGS. 6 and 7, flow diagrams 600 and 700 illustrate example procedures used by various embodiments. Flow diagrams 600 and 700 include some procedures that, in various embodiments, are carried out by a processor under the control of computer-readable and computer-executable instructions. In this fashion, procedures described herein and in conjunction with flow diagrams 600 and 700 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 110 and/or virtualized environment 120). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 600 and 700 such procedures are examples. That is, embodiments are well suited to performing various other procedures or variations of the procedures recited in flow diagrams 600 and 700. Likewise, in some embodiments, the procedures in flow diagrams 600 and 700 may be performed in an order different than presented and/or not all of the procedures described in one or more of these flow diagrams may be performed. It is further appreciated that procedures described in flow diagrams 600 and 700 may be implemented in hardware, or a combination of hardware with firmware and/or software provided by appliance 300.

FIG. 6 depicts a process flow diagram 600 for deploying a virtual machine via a pre-configured hyper-converged computing device, according to various embodiments.

At 610, of flow diagram 600, instructions are provided to display a single EULA prior to initial operation of the pre-configured hyper-converged computing device. For example, appliance 300 is purchased as a single SKU. Upon powering on appliance 300 for the first time, code or instructions provided by software module 320 are executed such that a single EULA is displayed to the end-user.

At 620, acceptance of the single EULA by an end-user is received. For example, an end-user accepts the displayed EULA. As such, the input to accept the EULA is received by appliance 300.

At 630, in response to instructions from the end-user, a first virtual machine is deployed in a virtualization infrastructure supported by the pre-configured hyper-converged computing device. For example, upon acceptance of the EULA, appliance 300 is enabled to deploy a virtual machine in the virtualization infrastructure. As such, the end-user, via the GUI provided by GUI module 326, is able to create and deploy virtual machines in the virtualization infrastructure.

It is noted that any of the procedures, stated above, regarding flow diagram 600 may be implemented in hardware, or a combination of hardware with firmware and/or software. For example, any of the procedures are implemented by a processor(s) of a cloud environment and/or a computing environment.

FIG. 7 depicts a process flow diagram 700 for providing a non-perpetual/term based EULA for a pre-configured hyper-converged computing device that supports a virtualization infrastructure, according to various embodiments.

At 710, a pre-configured hyper-converged computing device is offered for sale as a single SKU. For example, appliance 300 includes a pre-configured hardware platform (e.g., server nodes 310-1 through 310-n) and a software platform (e.g., software module 320). The appliance 300 including the hardware and software platform is offered for sale as a single SKU.

At 720, a non-perpetual EULA for the pre-configured hyper-converged computing device is provided to an end-user, such that the pre-configured hyper-converged computing device is operational upon acceptance of the non-perpetual EULA by the end-user. For example, upon initial powering on of the appliance and acceptance of the EULA, the appliance is subsequently operational and enabled to create a virtualization infrastructure and deploy virtual machines in the virtualization infrastructure.

It is noted that any of the procedures, stated above, regarding flow diagram 700 may be implemented in hardware, or a combination of hardware with firmware and/or software. For example, any of the procedures are implemented by a processor(s) of a cloud environment and/or a computing environment.

Examples of a GUI for Creating/Managing Hosts and Virtual Machines

FIGS. 8-30 depicts embodiments of a GUI for creating and/or managing host computing system (e.g., ESX hosts). As will be described in further detail below, the GUI provides various features alone and/or in combination that ease the implementation of and managing of one or more ESX hosts. It is noted that GUI module 326 includes code or instructions that enable the utilization of the GUI for creating and managing appliances (e.g., ESX hosts) and virtual machines of the virtualization infrastructure.

Figure 8:
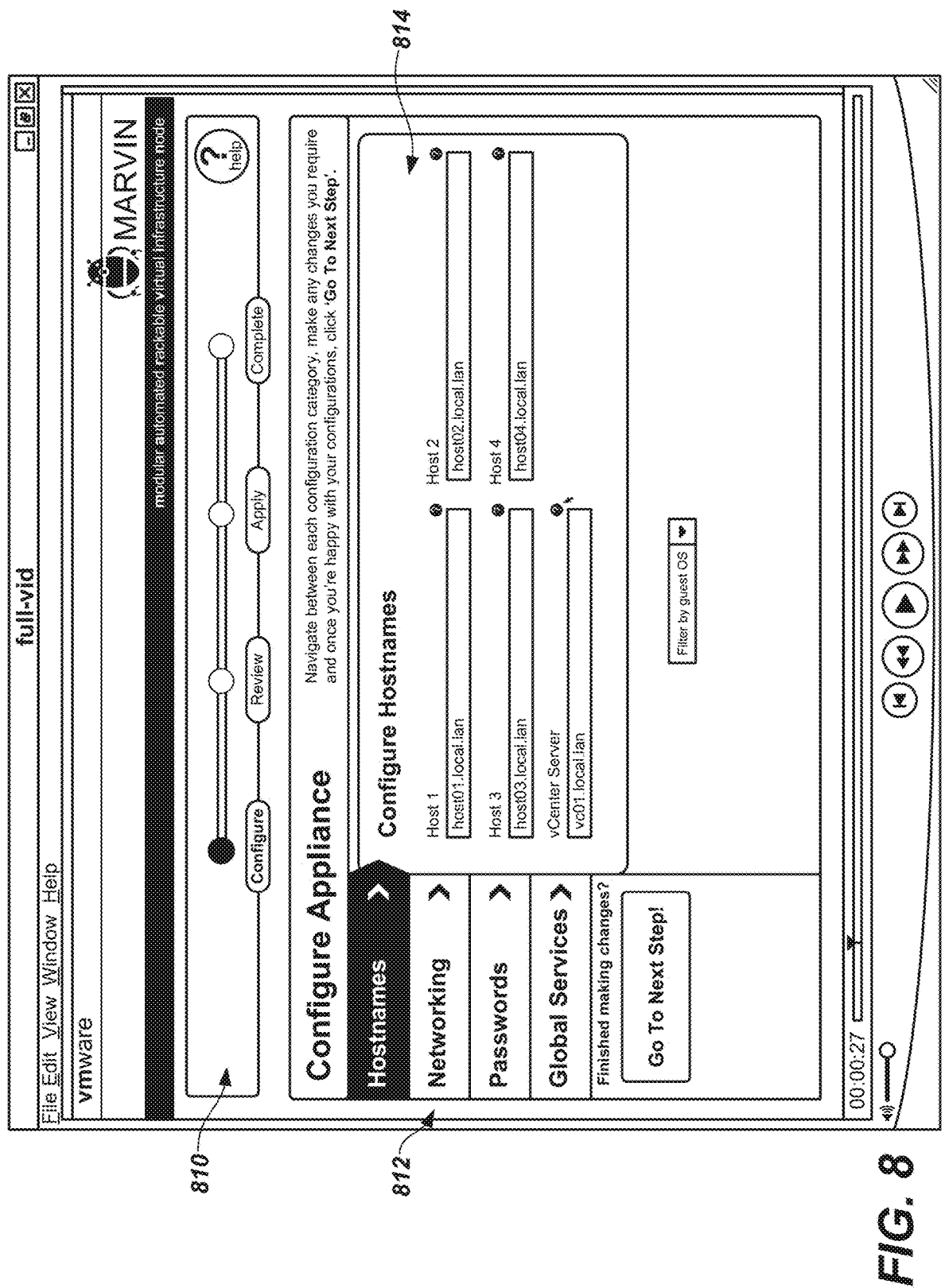
FIGS. 8-30 depict embodiments of various screenshots of a graphical user interface for creating/managing one or more ESX hosts, according to various embodiments.

FIG. 8 depicts a GUI associated with the configuration of a group of ESX hosts (or appliance). The roadmap can include various locations, such as configure, review, apply and complete associated with the creation/managing of a group of ESX hosts.

In one embodiment, the GUI of FIG. 8, is displayed subsequent the initial powering on of appliance 300 and acceptance of the EULA displayed to the end-user.

Although appliance 300 is pre-configured to create/manage a virtualization infrastructure and virtual machines, appliance 300 may provide additional configuration parameters that are described in further detail with respect to at least FIGS. 8-30.

Portion 810 depicts the "roadmap" of creating/managing a group of ESX hosts. In various embodiments, an ESX host are an individual appliance, such as appliance 300, or is an individual server node of an appliance (e.g., server nodes 310-1 through 310-n).

Portion 812 includes a column of configuration characteristics, such as, hostnames, networking, passwords, global services, etc. The configuration characteristics will be described in further detail below.

Portion 814 is a configure hostnames portion that provides entry of names of various ESX hosts, vCenter servers, etc. A user enters the name of the hosts (e.g., host 1 is host01.local.lan) and a vCenter Server (e.g., vc01.local.lan).

Although portion 814 lists four hosts and a vCenter Server, it should be appreciated that portion 814 may provide entry of names for any number of hosts and vCenter Servers.

Figure 9:
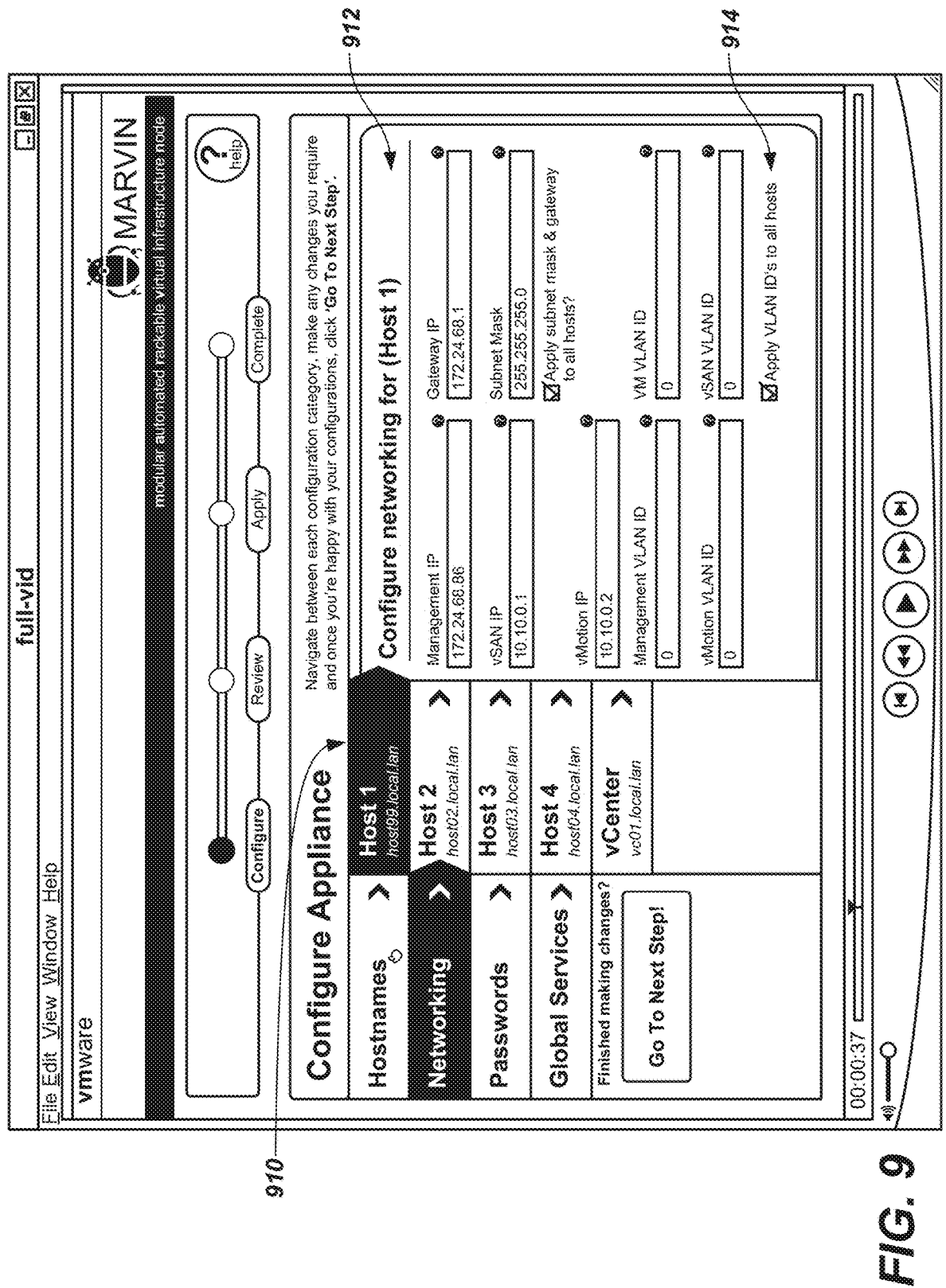

Referring now to FIG. 9, in response to selecting "networking" in portion 912, portion 910 is displayed. Portion 910 is a list (in a column) that displays the hosts, vCenter Servers that were entered in portion 914. As a result, the GUI of FIG. 9, enables the management of ESX hosts/vCenter servers at a single location.

In one embodiment, portion 910 includes Host 1, Host 2, Host 3, Host 4, and vCenter with their associated names. However, it should be appreciated that any number of hosts may be listed in portion 910. For example, if new appliances are added for scale out purposes to allow for more capacity for virtual machines, then the list of appliances dynamically changes to include the new appliances.

Portion 912 depicts host properties of a selected host in portion 910 (e.g., properties of Host 1). When Host 1 tab of portion 910 is selected, then portion 912 is displayed.

Portion 912 can include any information or properties regarding a host for creating/managing a single ESX host. For example, portion 412 can include Management IP, vSAN IP, vMotion IP, (i.e., the IP addresses that other hosts use for live migrations to the host being configured), Mangement VLAN ID, vMotion VLAN ID (i.e., the VLAN ID that other hosts use for live migrations to the host being configured), Gateway IP, Subnet Mask, VM VLAN ID, vSan VLAN ID, etc.

In various embodiments, hosts can be configured with individual IP addresses for each network (e.g., Management IP, vMotion IP, etc.). Hosts can also be assigned IP ranges for each network. A range can be defined for a subnet (e.g., 10.0.0.1-10.0.0.254). This range can be given a name and then individual or multiple hosts then use that range. This prevents the need to individually define each IP for each network on each host. Conflict checking may be applied to make sure multiple hosts don't try to attach to the same IP if they are using a range.

Additionally, IP ranges allow a single point of IP configuration for each network. This facilitates multiple server nodes to be added into the cluster without individual configuration.

It should be appreciated that the IP ranges (or IP pools) may be an alternative to defining individual host networking. For example, some hosts may be configured to use a pool, while other hosts are configured individually.

Various properties of one host may be applied to all hosts. For example, subnet mask and gateway properties may be applied to all hosts. In another example, VLAN IDs may be applied to all hosts.

Alternatively, various properties entered for one host may not be applied to other hosts.

It should be appreciated that the properties of portion 912 may include different objects inside a vCenter. In general, in one embodiment, a vCenter is the centralized management tool for the vSphere suite. A VMware vCenter Server allows for the management of multiple ESX hosts and virtual machines (VMs) from different ESX hosts through a single console application.

Portion 912 includes different types of data that is divided into a logical group and attached to a host. Additionally, the data in portion 912 may be data that has a parent/child relationship. For example, portion 912 includes information that is a child to a selected (parent) host.

Figure 10:
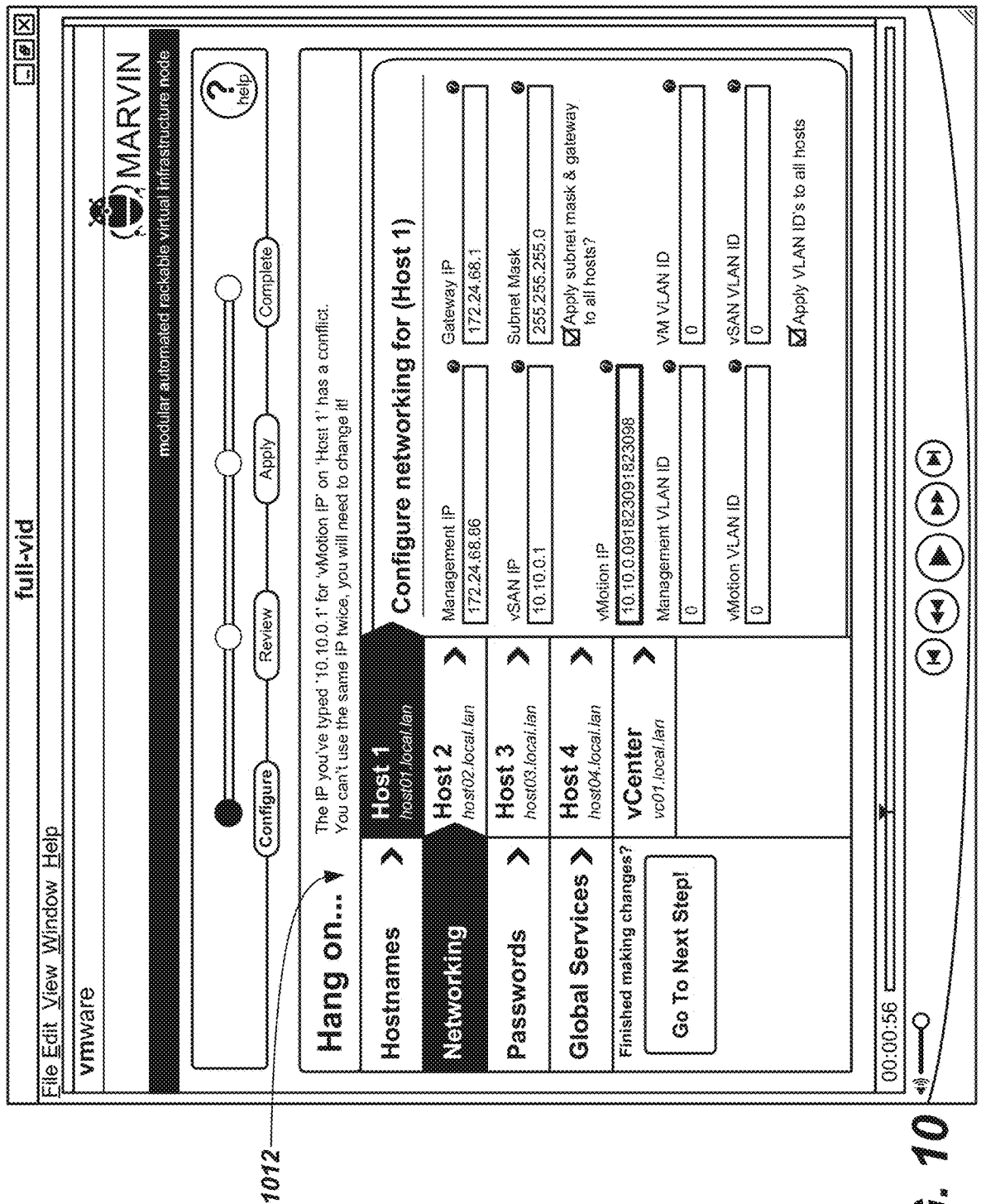

Referring now to FIG. 10, portion 1012 is a real-time validation and conflict avoidance portion. Portion 1012 is displayed in real-time when there is a validation/conflict issue when entering information in portion 912.

For example, if there is an incorrect IP address entered then portion 1012 is immediately displayed. In another example, if there is a conflict of an entered IP address then an error message is displayed.

Any issues (e.g., errors) that are described in portion 1012 are to be corrected in order to advance to the next step in the creation/management of ESX hosts.

Figure 11:
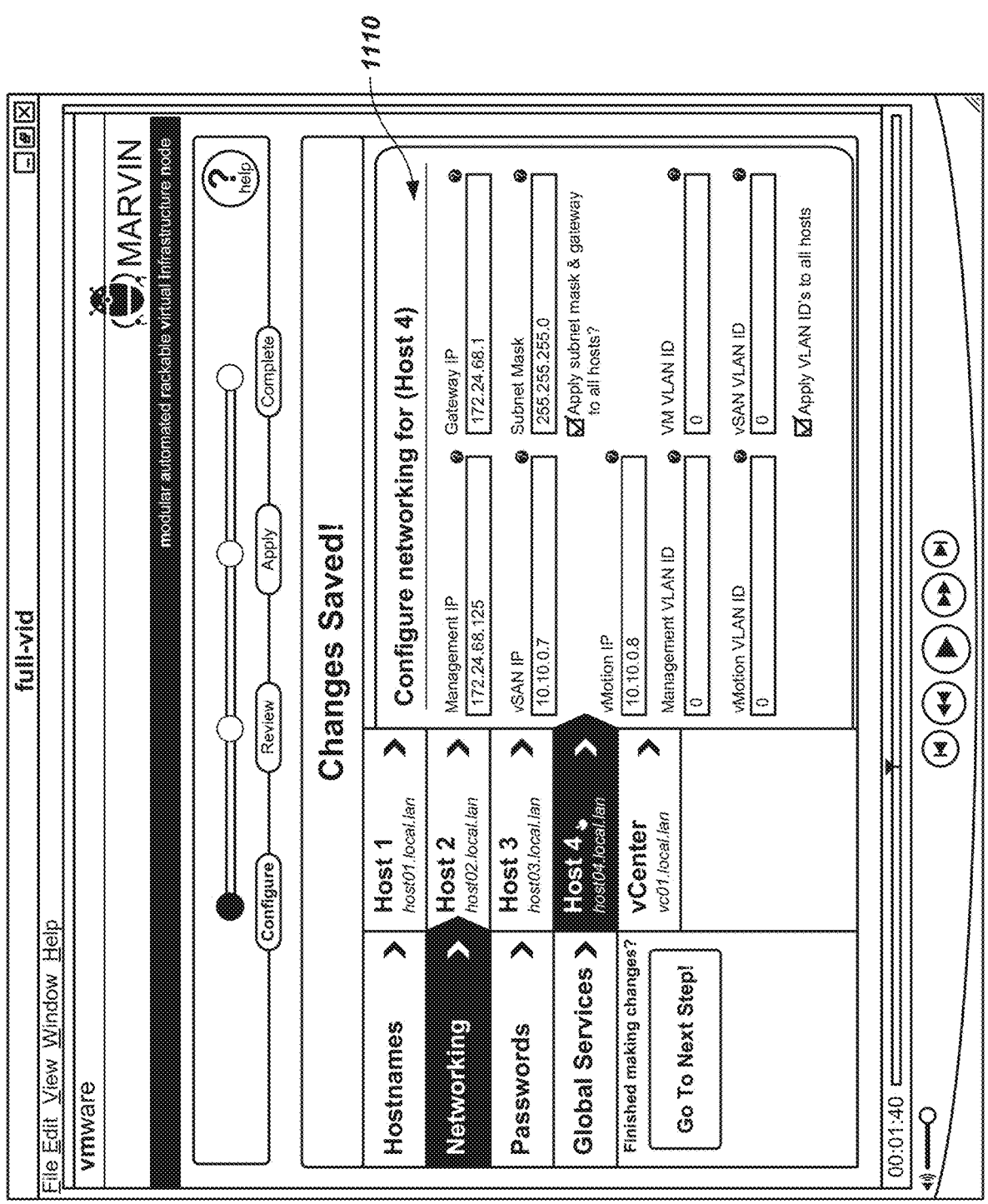

Referring now to FIG. 11, portion 1110 indicates that changes are saved.

When entering information (e.g., in portion 912), the information is saved automatically. That is, the user is not required to enter or provide a particular "save" actions. In response to information entered and saved, portion 1110 is displayed to indicate to the user that the information is saved.

Moreover, any information provided in the GUIs, depicted herein, are automatically saved, with or without the display of portion 1110.

Figure 12:
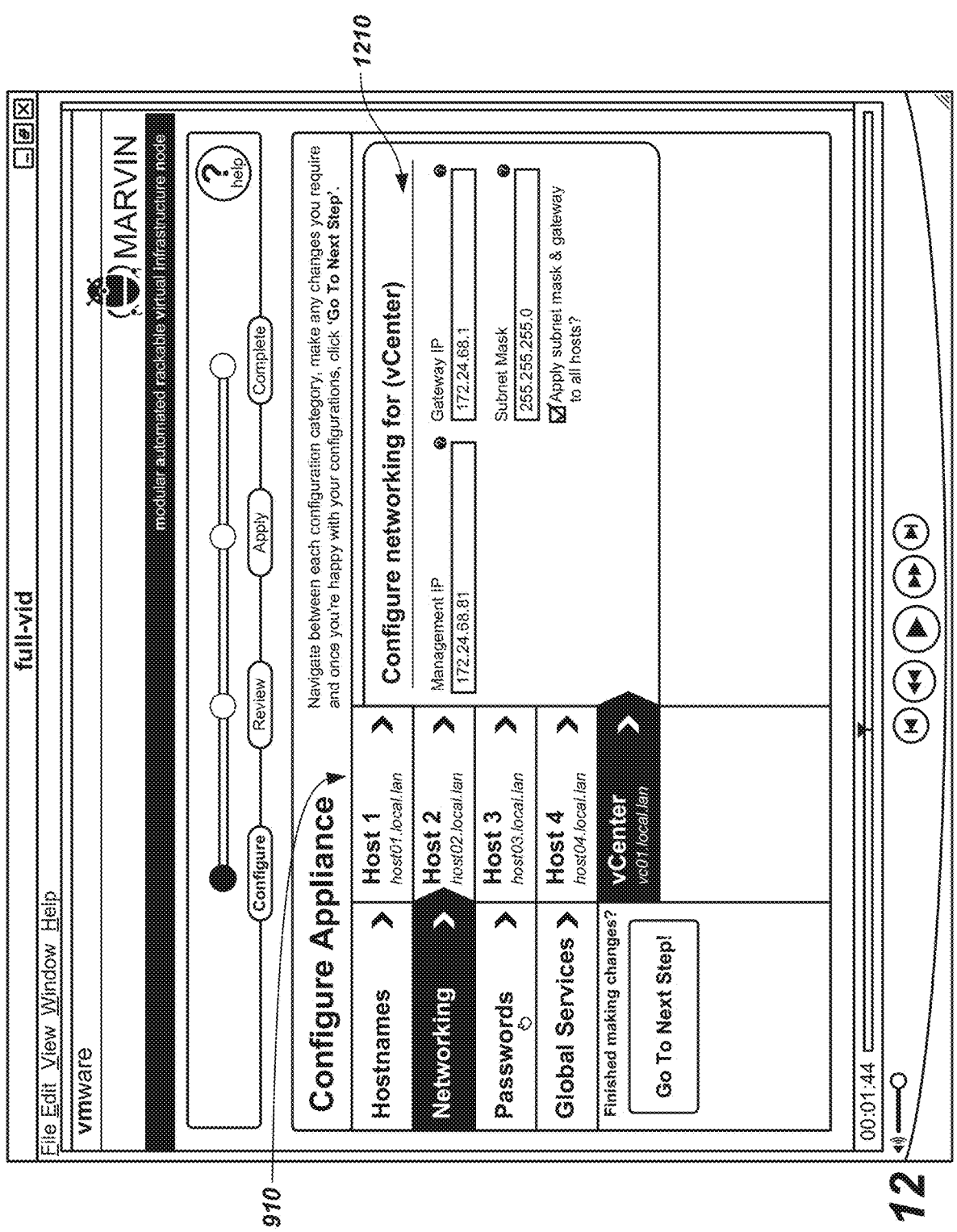

Referring now to FIG. 12, portion 1210 includes the properties associated with a vCenter. When the vCenter tab is selected, then portion 1210 is displayed.

In one embodiment, portion 1210 includes Management IP, Gateway IP, Subnet Mask, etc.

In one embodiment, properties of the vCenter may be applied to one or more hosts. Alternatively, various properties entered of the vCenter may not be applied to other hosts.

Figure 13:
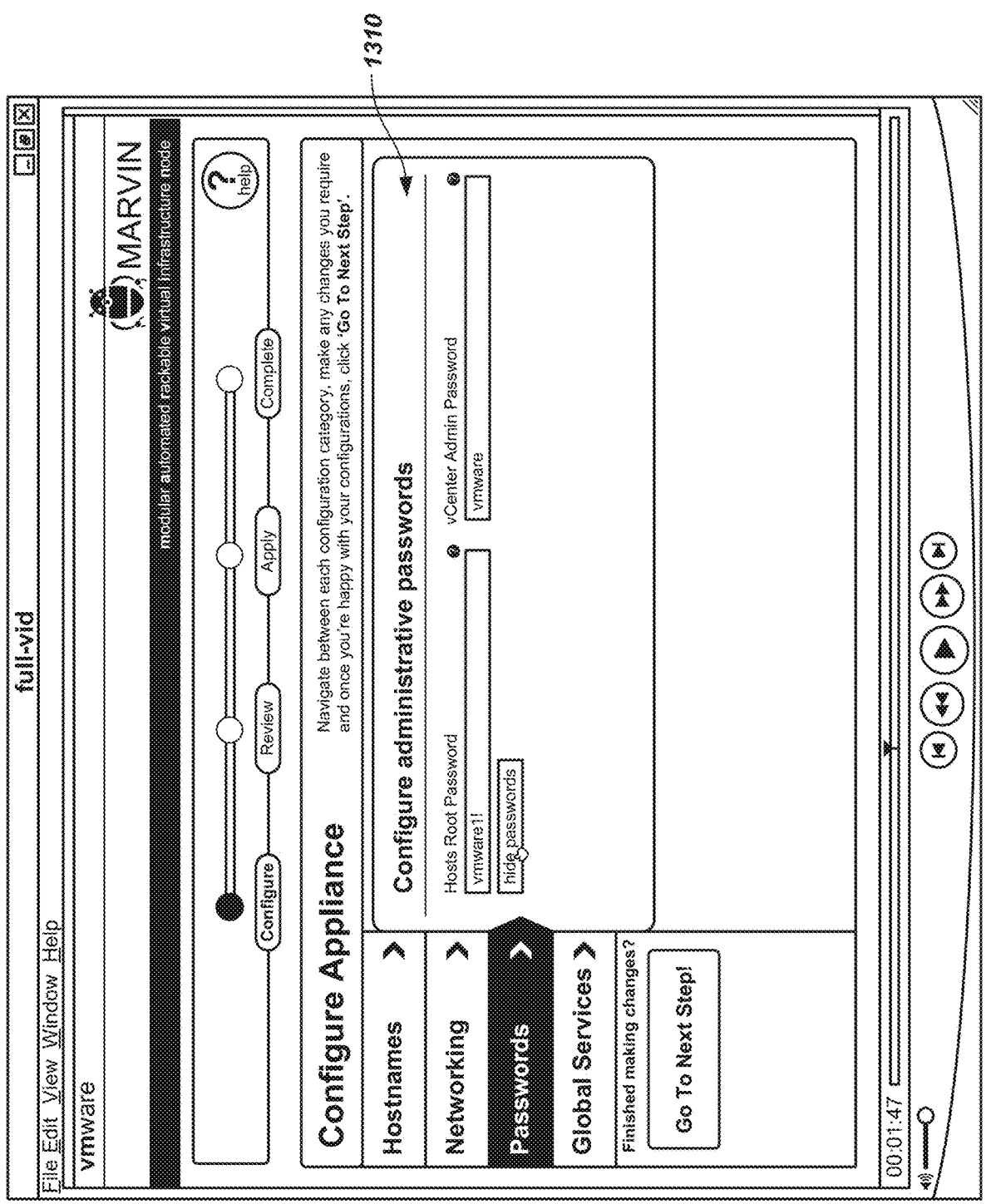

Referring now to FIG. 13, portion 1310 includes passwords associated with ESX hosts, vCenters when creating/managing ESX Hosts and vCenter. For example, portion 1310 is displayed when the "passwords" tab is selected, and a user is able to enter a password for both ESX Hosts Root and vCenter Admin.

Figure 14:
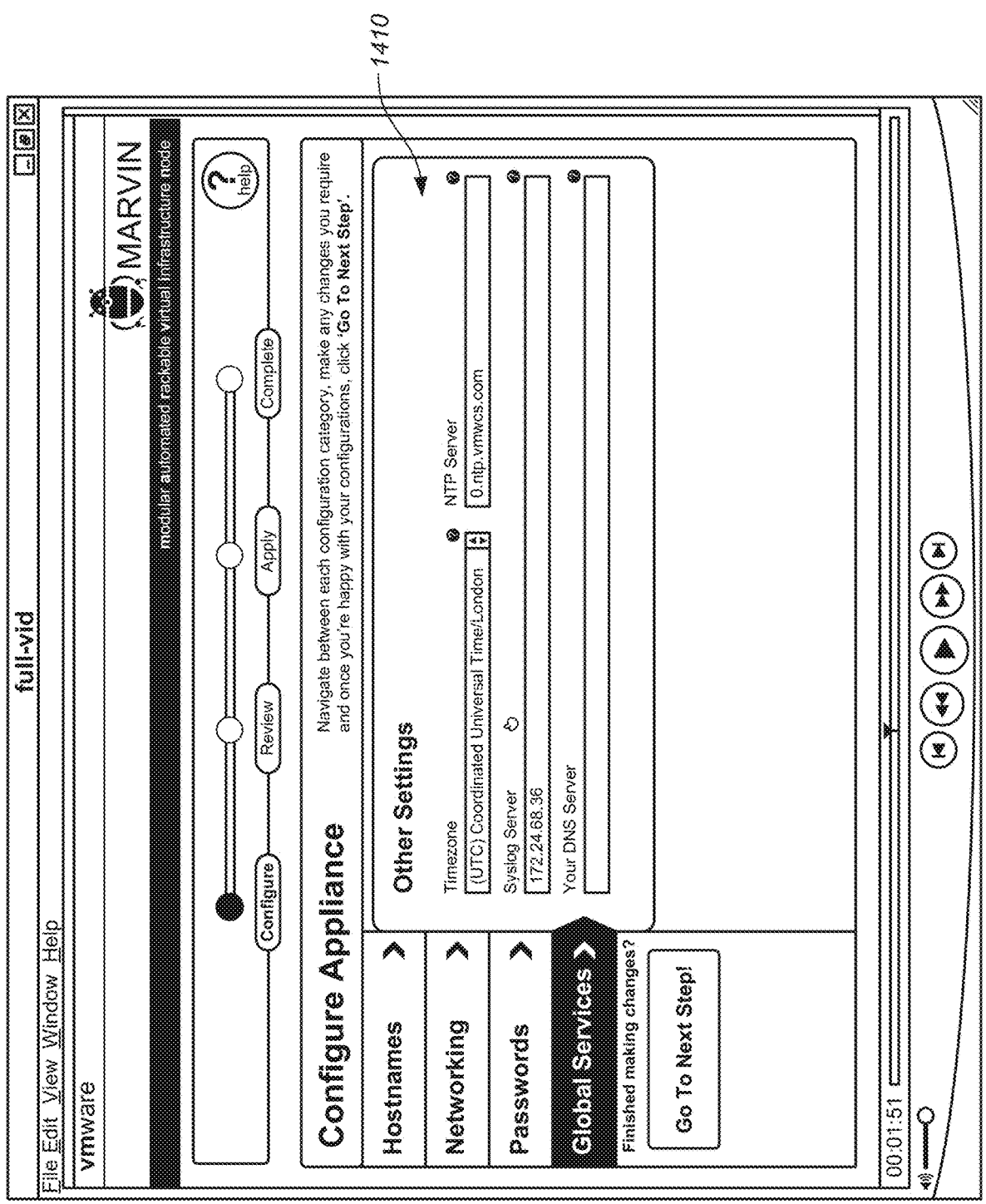

Referring now to FIG. 14, when a "global services" tab is selected, portion 1410 is displayed. Portion 1410 includes various attributes, setting, properties of global services associated with creating/managing ESX Hosts and VMs.

In one embodiment, portion 1410 includes a timezone, NTP server Syslog server, DNS server, etc.

In various embodiments, the entry of the global services is pre-determined and a user selects from a drop down box the entry that is desired for the particular parameter (e.g., timezone).

In one embodiment, entry of a property in portion 1410 is applied to all ESX hosts and/or the vCenter. Alternatively, an entry of a property is not applied to all hosts and/or vCenter.

It should be appreciated that user input in portion 1410 is provided via a GUI. In contrast, in conventional systems, the properties provided in portion 1410 are enacted via scripting.

Figure 15:
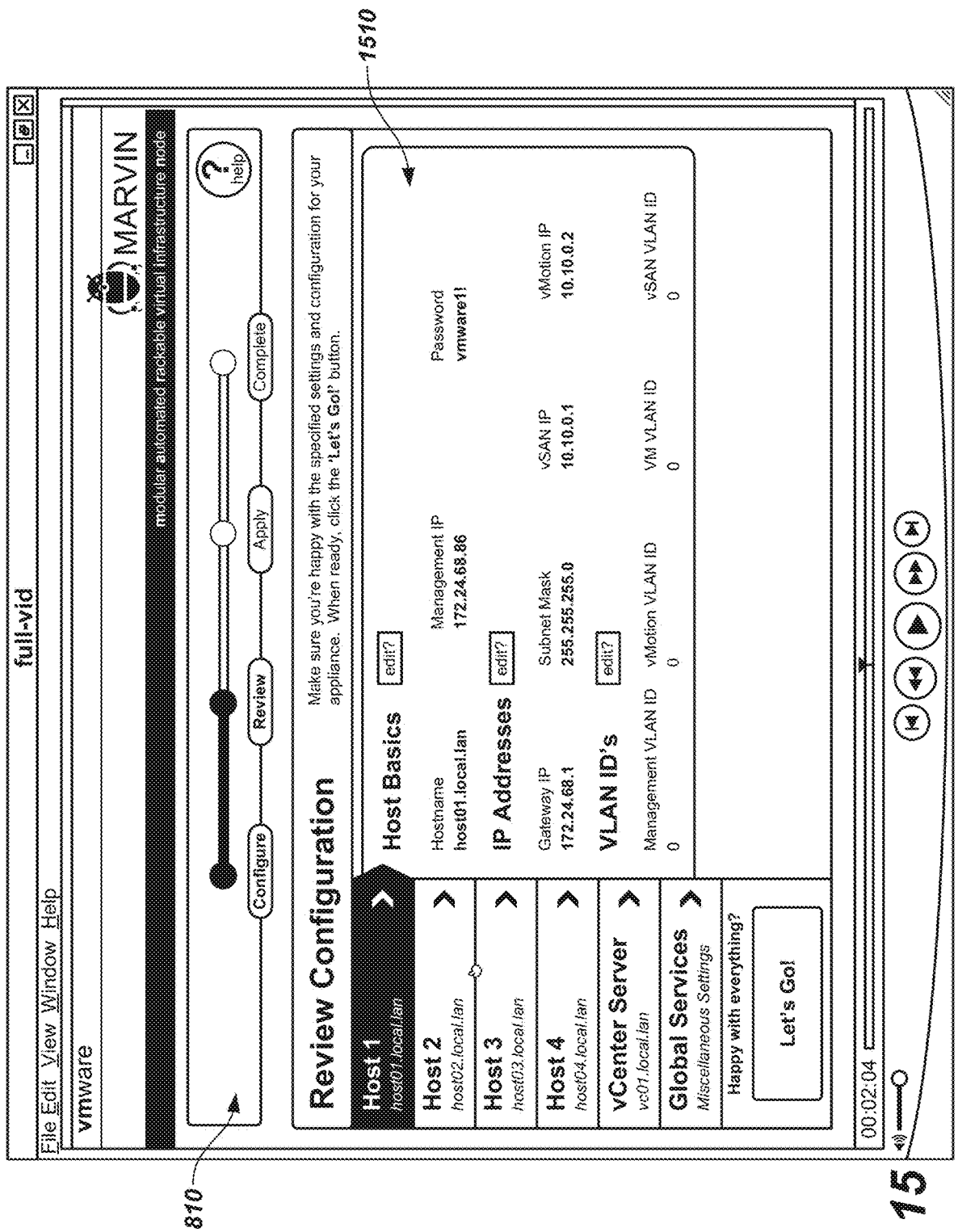

FIG. 15 depicts an embodiment of a GUI that includes portion 1510. Portion 1510 depicts the data entered and is provided for review. For example, portion 1510 includes ESX host basics (e.g., hostname, management IP, password, etc.), IP addresses (e.g., gateway IP, subnet mask, vSAN IP, vMotion IP, etc.), and VLAN IDs (e.g., Management VLAN ID, vMotion VLAN ID, VM VLAN ID, vSAN VLAN ID, etc.).

Portion 1510 provides an edit option for any displayed property.

Figure 16:
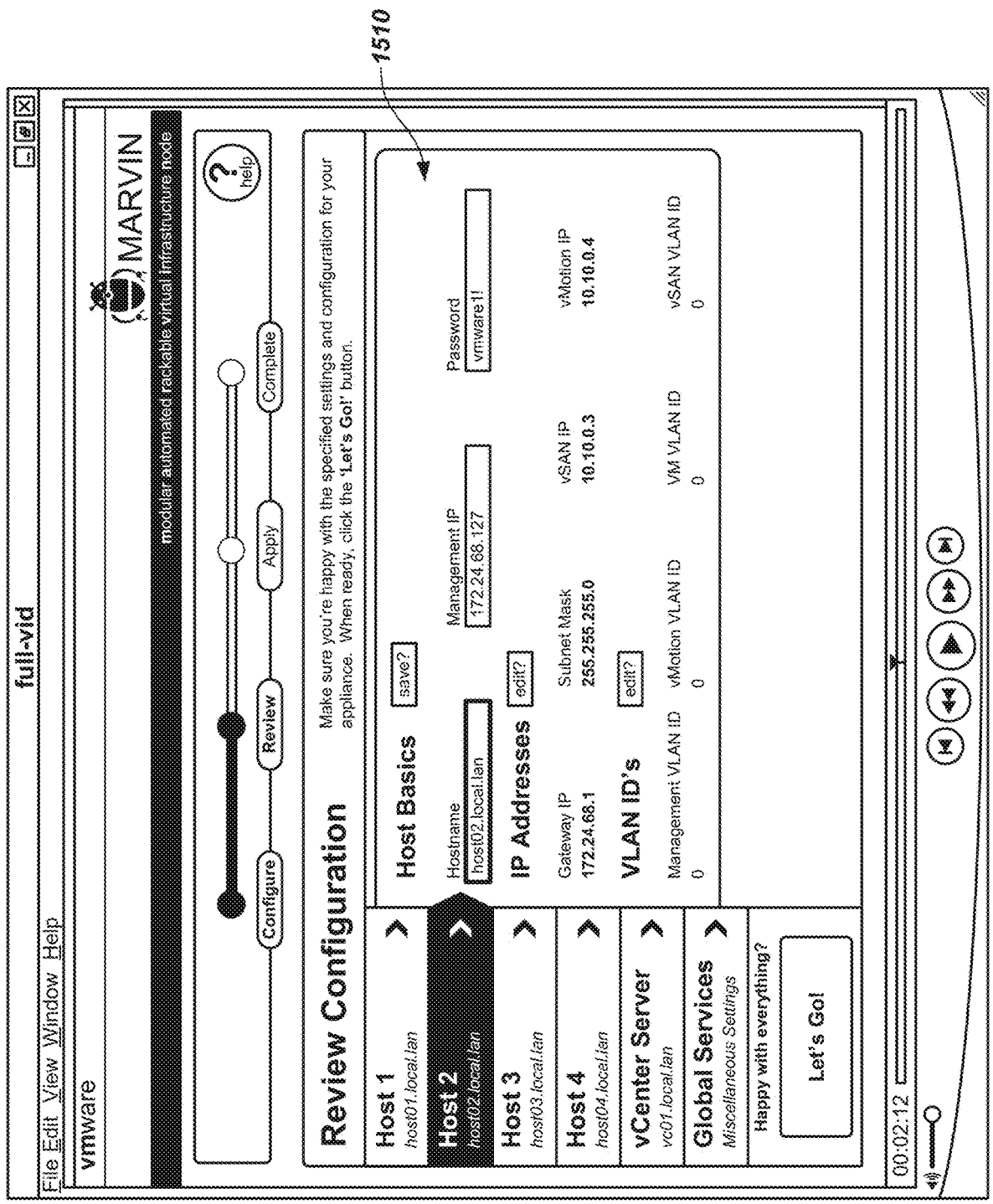

FIG. 16 depicts an embodiment of a GUI that depicts a user selecting the edit option of portion 1510. In response to selecting the edit button, a user is able to edit the properties associated with the selected edit option.

Any changes are automatically saved.

Figure 17:
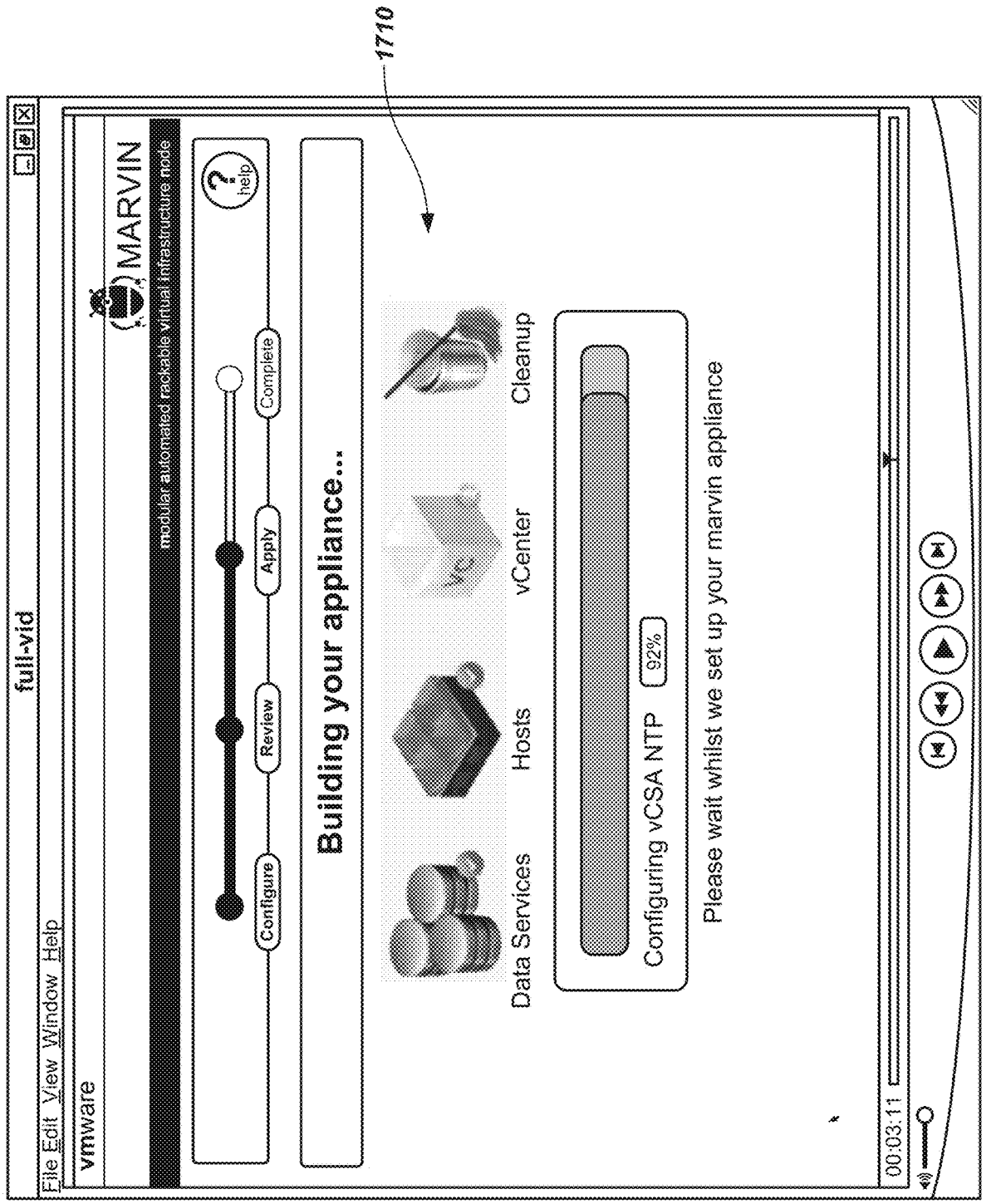

FIG. 17 depicts a GUI having portion 1710. Portion 1710 displays the progress of building one or more ESX Hosts and vCenters (or appliance). In particular, portion 1710 depicts various attributes when they are accomplished, such as, data services, ESX hosts, vCenter, clean up, etc.

It should be appreciated that actions provided in the GUIs, as depicted in FIGS. 8-17 pertain to ESX hosts and vCenter (or appliance). Additionally, actions provided in the GUIs, as depicted in FIGS. 18-30, pertain to VMs.

Figure 18:
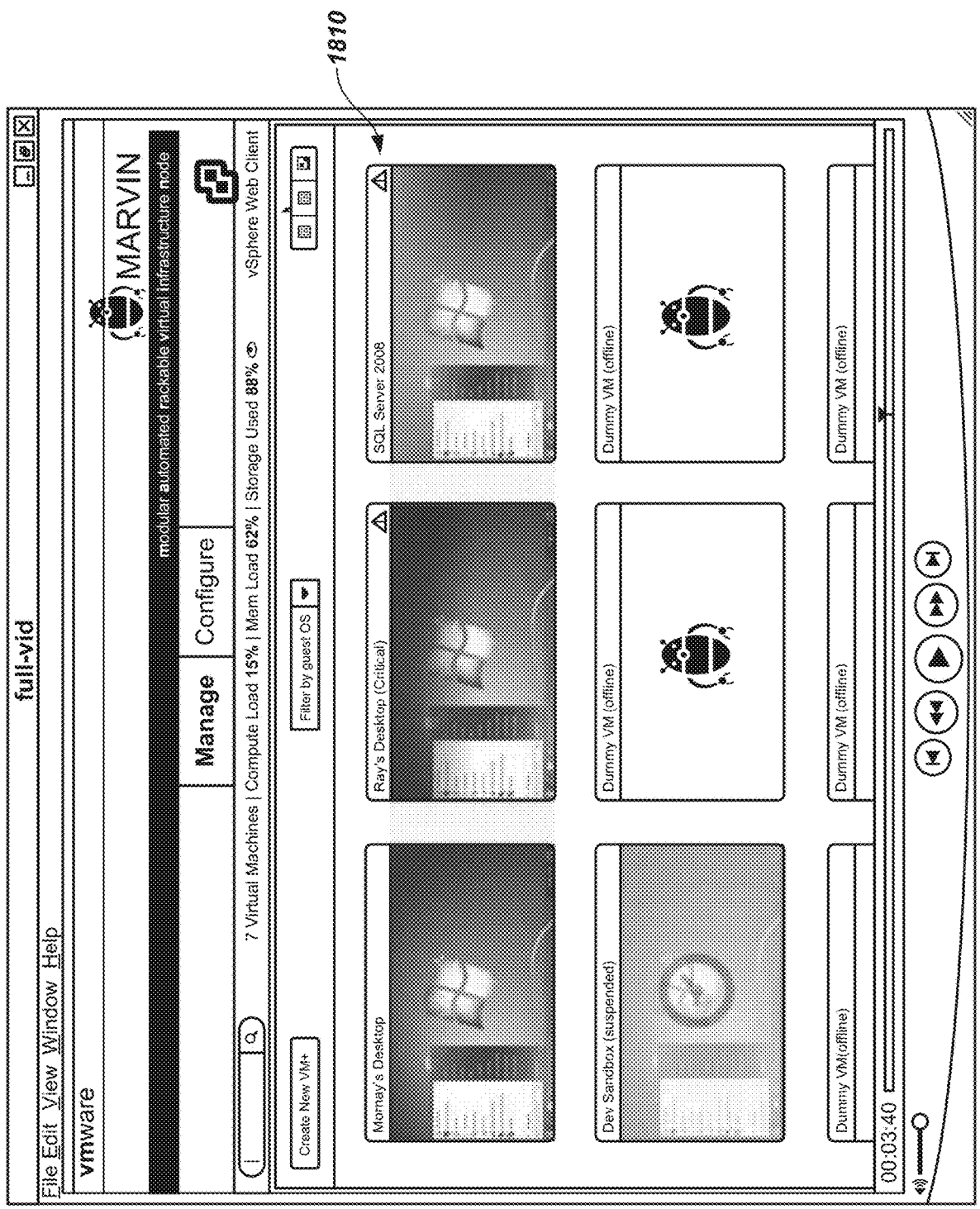

FIG. 18 depicts a GUI having portion 1810. The GUI allows for the management and configuration of one or more mounted VMs (e.g., Mornay's Desktop, Ray's Desktop, SQL Server 2006) and/or appliances. For example, the GUI depicts that there are seven virtual machines, with a 15% compute load, 62% memory load and 86% storage usage.

In particular, portion 1810 depicts the created VMs in a tile format, wherein each tile is a desktop view associated with the VM. Additionally, portion 1810 includes color coding that visually indicates the health, errors or warnings. For example, a VM may have a red color to depict that it has a critical error (e.g., low memory allocation).

Additionally, portion 1810 includes a filter to filter the order in which information is provided. For example, information can be filtered based on guest OS, uptime, date created, health, status, etc.

Figure 19:
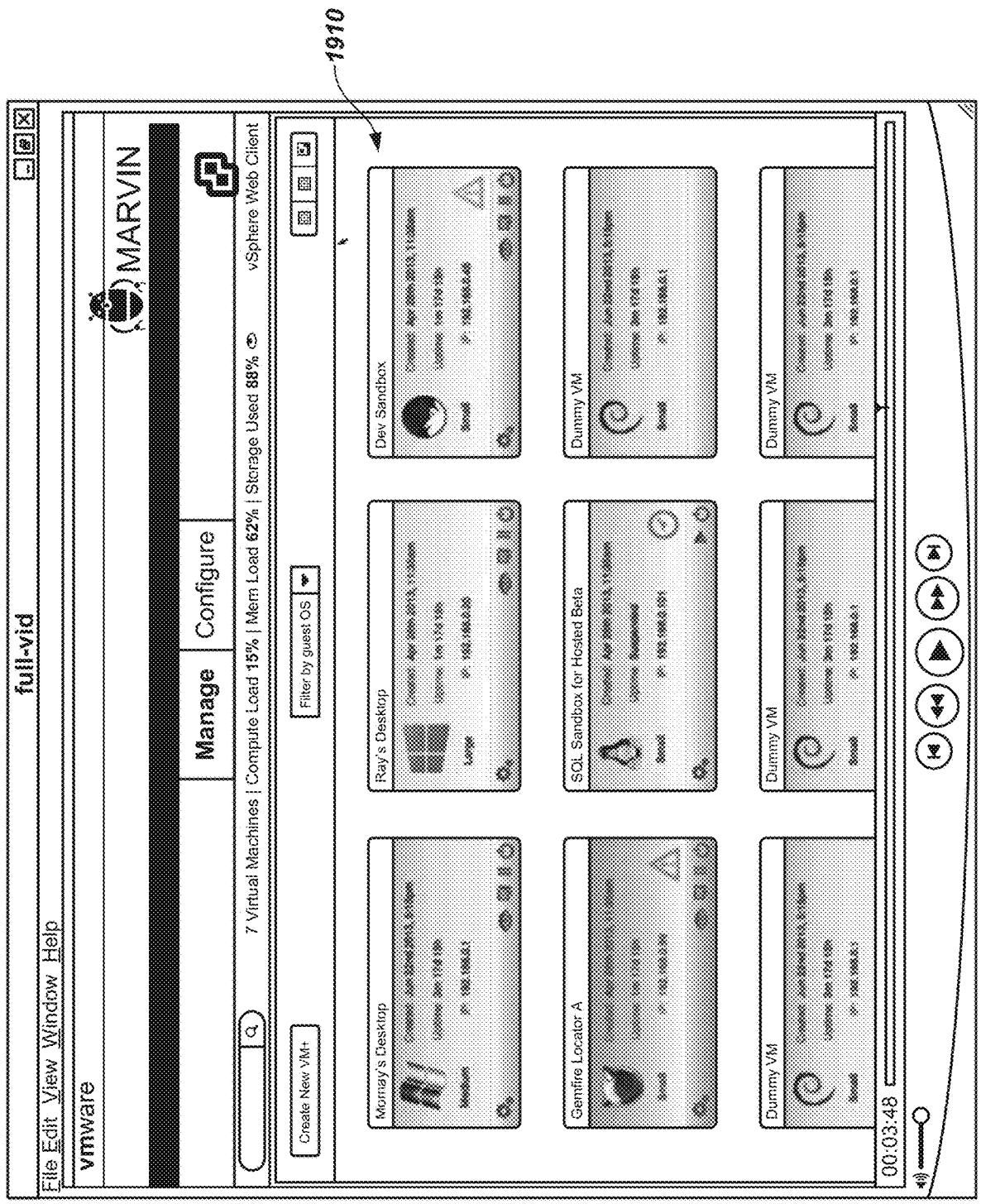

FIG. 19 depicts a GUI having portion 1910. Portion 1910 depicts the management/configuration of one or more mounted VMs (similar to FIG. 18). However, portion 1910 depicts the information in an abbreviated tile format.

Each tile may display, creation date, uptime, IP, etc.

Additionally, portion 1910 includes color coding that visual indicates the health, errors or warnings. For example, a VM may have a red color to depict that it has a critical error (e.g., low memory allocation).

Portion 1910 includes a filter to filter which the order in which information is provided. For example, information can be filtered based on guest OS, uptime, date created, health, status, etc.

Figure 20:
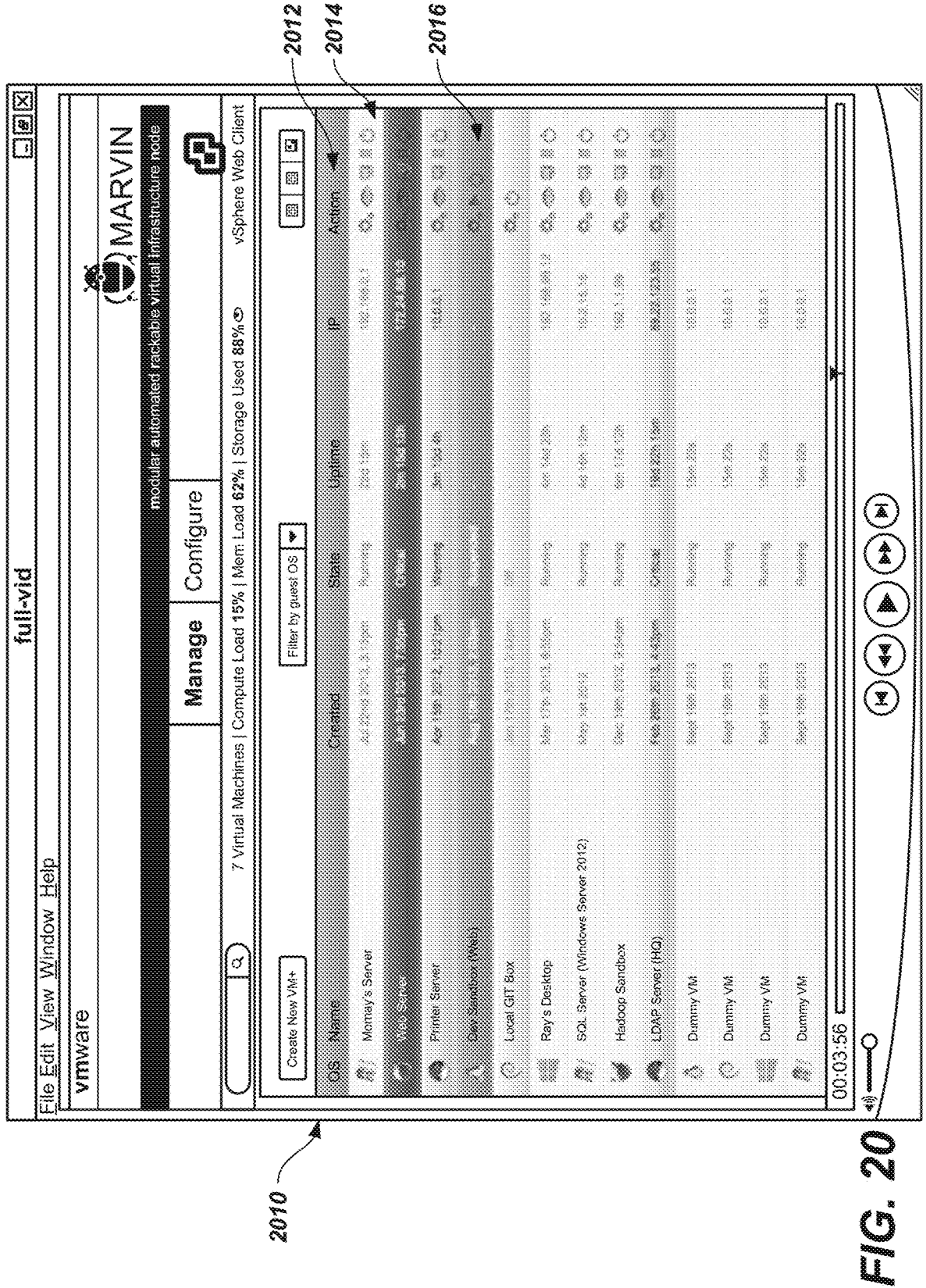

FIG. 20 depicts a GUI having portion 2010. Portion 2010 displays similar information as portions 1810 and 1910. However, portion 2010 displays the information in a detailed list format.

In one embodiment, portion 2010 includes action portion 2012. Action portion 2012 is a column of actions that can be implemented on the corresponding VM. Such actions can be any action that can be implemented on the VM. For example, power on, pause, view, etc.

It is noted that the actions displayed are only the actions that are able to be implemented at that time. That is, an action is not displayed if it is not able to be implemented on the VM at that time. For example, a first VM may have a displayed action icon of powering on, because it is not powered on. However, a second VM is powered on and therefore does not have a displayed action icon of powering on.

Accordingly, the GUI enables for optimal and intuitive managing/configuration of VMs.

In contrast, in conventional system, an action icon may be greyed out if it is not able to be implemented at that time.

It should be appreciated that not depicting actions, as described above, may also be called an intrinsic reveal pattern. The intrinsic reveal pattern only shows the user options they can make sense of when they need them. In other words, the user is presented with minimal choices until they request more after picking a task they want to start.

Figure 21:
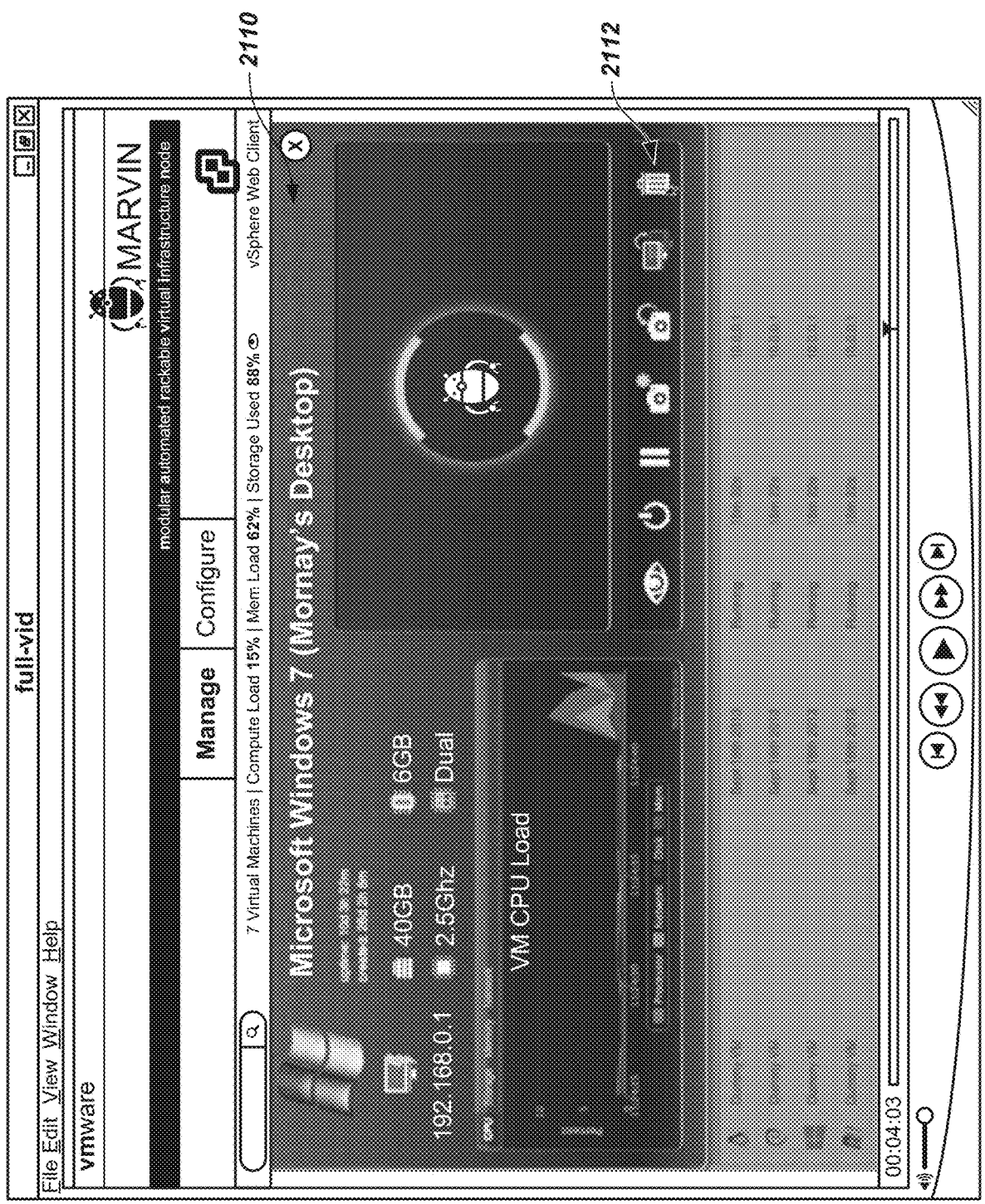

FIG. 21 depicts a GUI including portion 2110. In one embodiment, portion 2110 depicts information associated with a selected VM (e.g., Mornay's Desktop), such as a VM that is listed in portion 2010.

Portion 2110 depicts information such as IP address, memory size, storage size, CPU size and type.

Portion 2110 may also include a chart that displays various real-time or historical parameters such as the percent of CPU usage, storage usage, memory usage, network usage. Moreover, the information may be overlayed with one another.

Portion 2110 also includes portion 2112. Portion 2112 enables various actions to be performed on the VM. Such actions may include, powering on, deleting, etc.

FIGS. 22-26 depicts GUIs that are associated with creating a new VM, which will be discussed in further detail below. It is noted that the GUI for creating a new VM provides bi-directional instructional flow. That is, a user will go from left to right, and/or right to left in user actions associated with creating a VM.

Figure 22:
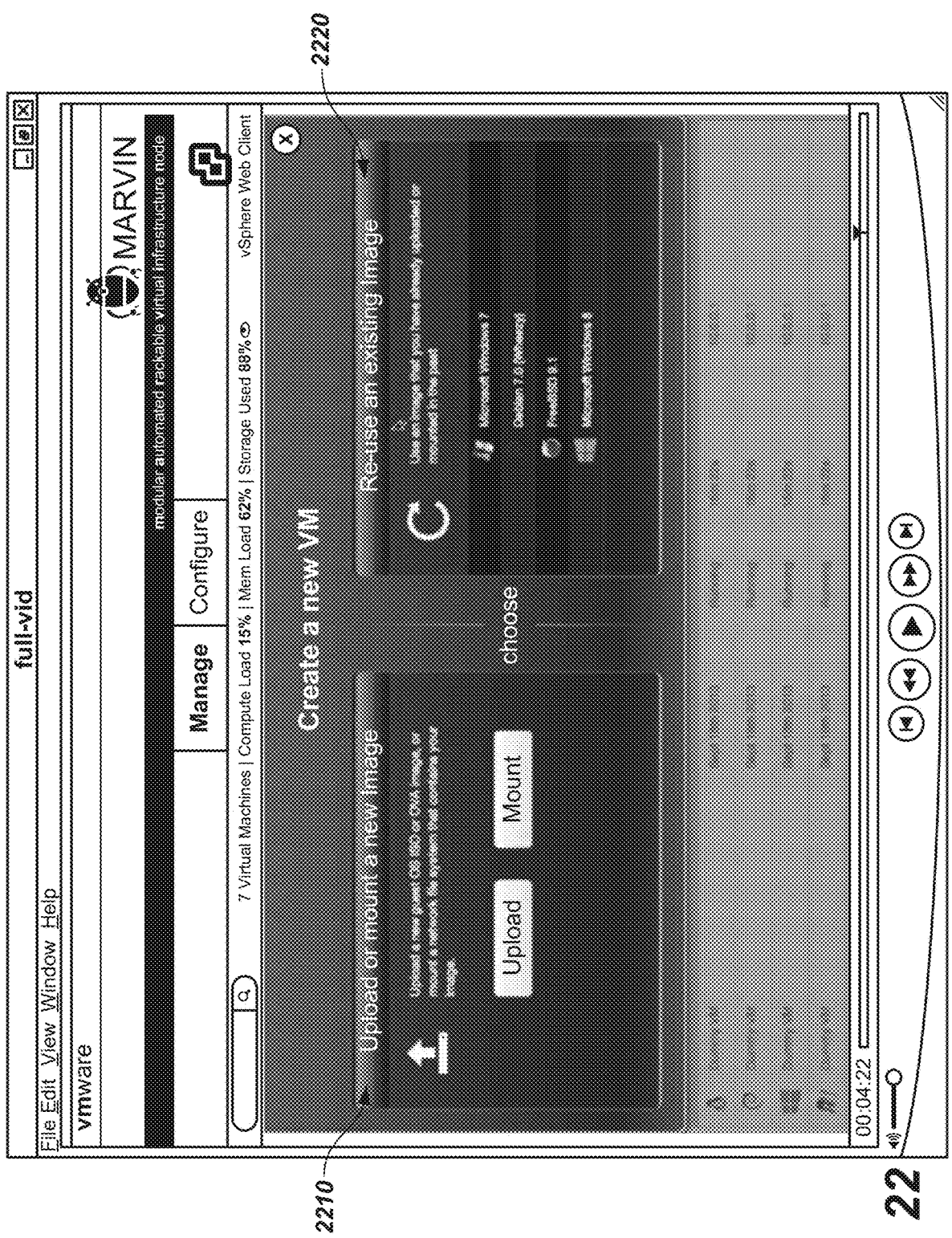

FIG. 22 depicts a GUI that includes portion 2210 and portion 2220. Portion 2210 provides an option for uploading or mounting a new image of a VM. For example, an option to (1) upload a new guest OS ISA or OVA image, or (2) mount a network file system that contains the image.

Portion 2220 enables a user to select whether to re-use an existing image. For example, using an image that has already been updated or mounted in the past. Such options may include Microsoft Windows 7, Debian 7.0 (Wheezy), FreeBSD 9.1, Microsoft Windows 8, etc.

Figure 23:
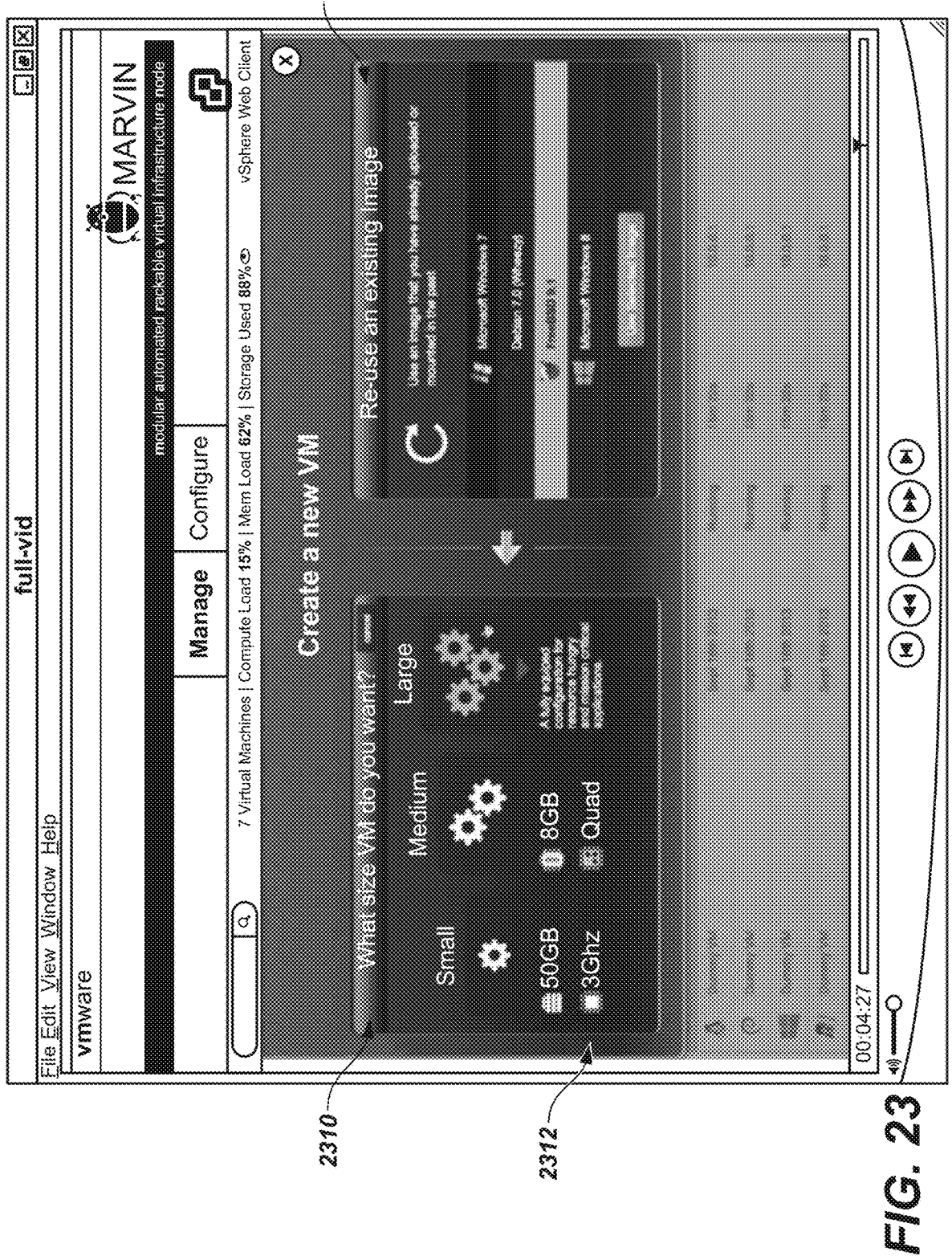

FIG. 23 depicts a GUI with a selection of reusing an existing image of portion 2220. In response to the selection in portion 2220, portion 2310 is displayed.

Portion 2310 provides an option of the size of VM. For example, small, medium or large.

When hovering over the large VM selection, portion 2312 is displayed. Portion 2312 provides description for the large VM selection. For example, if a large VM is selected, then the large VM will include 500 GB of storage, 8 GB of memory, 3 Ghz CPU, Quad CPUs, etc.

Figure 24:
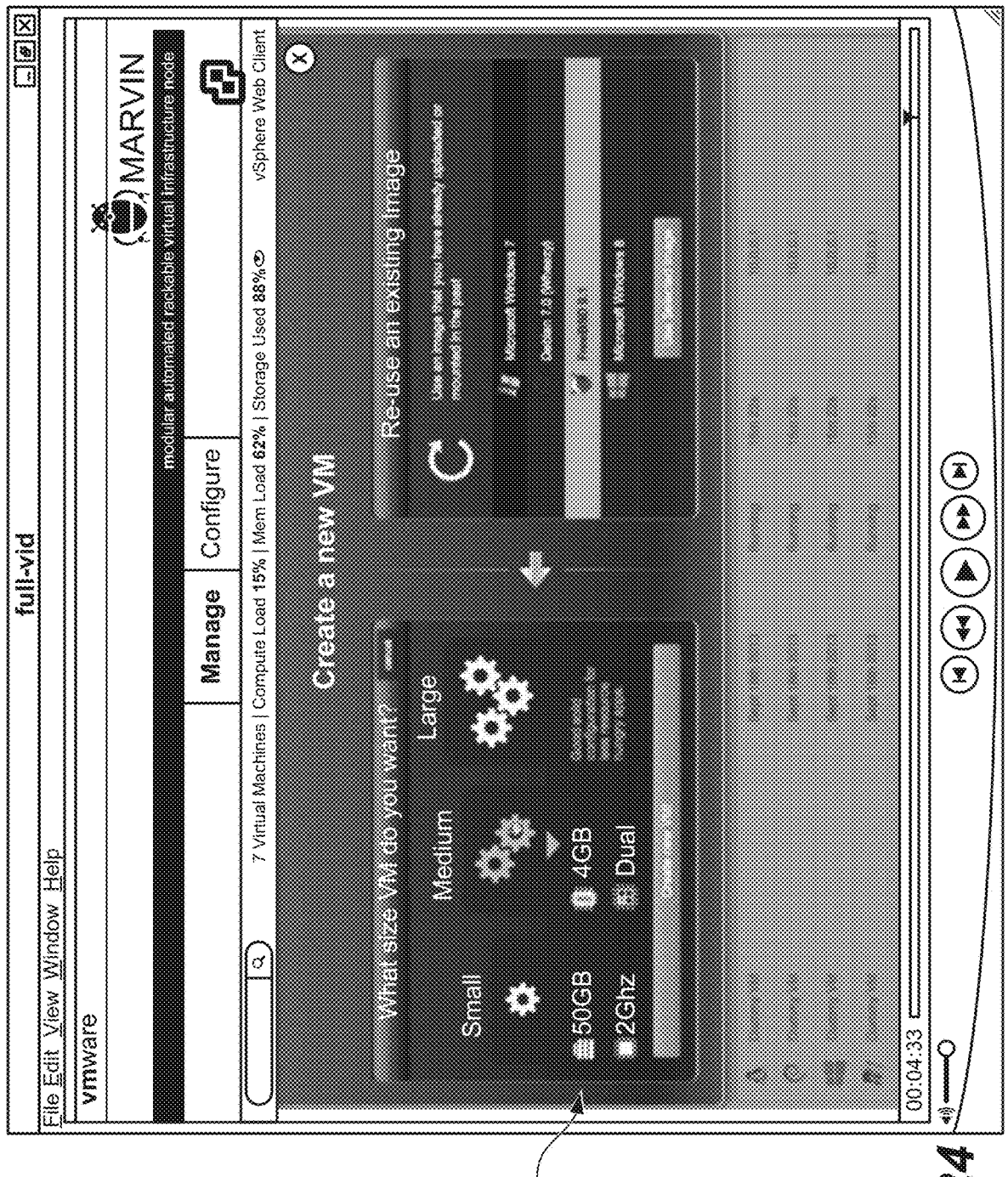

FIG. 24 depicts a GUI with a cursor hovering over the medium sized VM. When hovering over the medium VM selection, portion 2412 is displayed. Portion 2412 provides description for the medium VM selection. For example, if a medium VM is selected, then the medium VM will include 15 GB of storage, 4 GB of memory, 2 Ghz CPU, Dual CPUs, etc.

Figure 25:
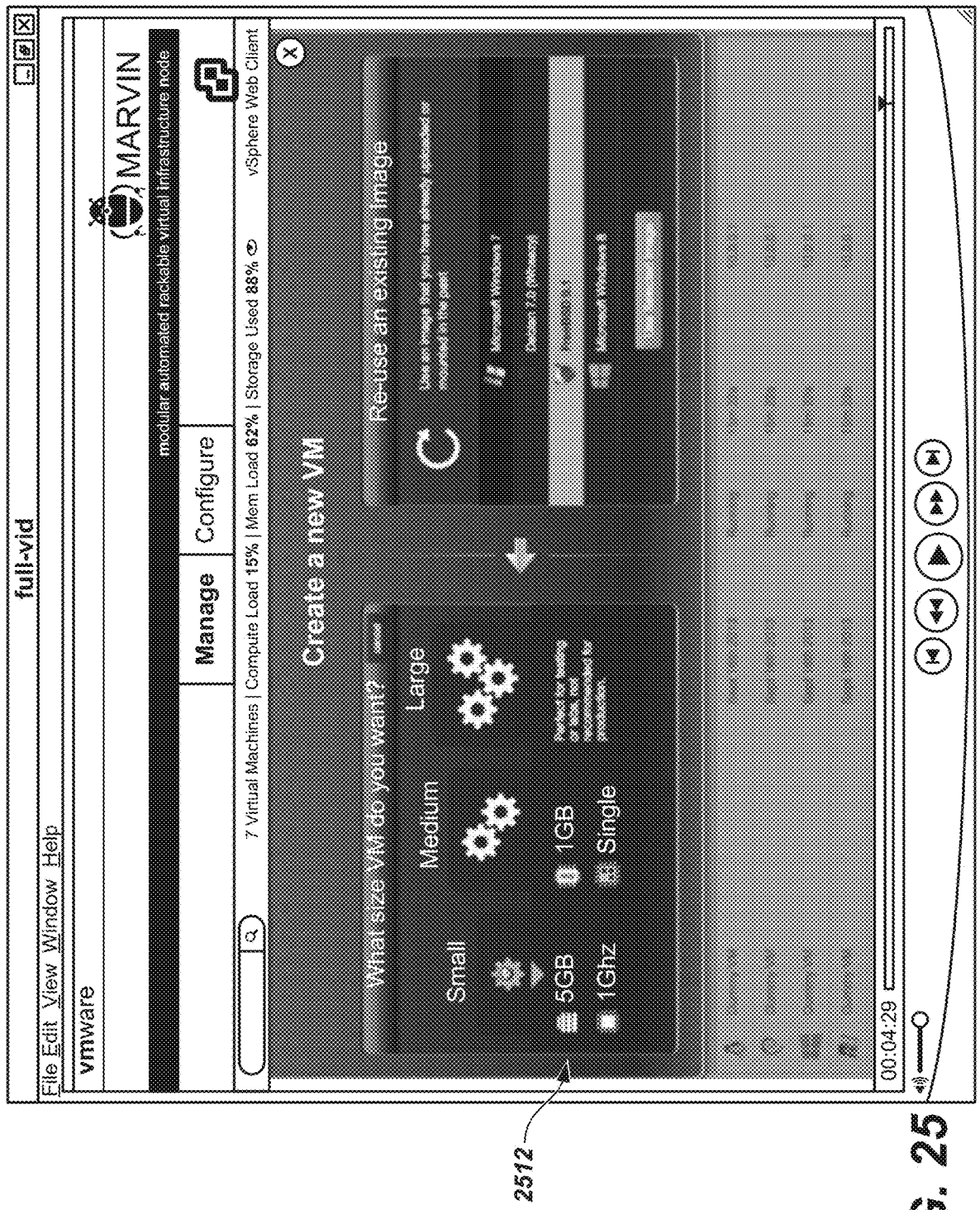

FIG. 25 depicts a GUI with a cursor hovering over the small sized VM. When hovering over the small VM selection, portion 2512 is displayed. Portion 2512 provides description for the small VM selection. For example, if a small VM is selected, then the small VM will include 5 GB of storage, 1 GB of memory, 1 Ghz CPU, a single core CPU, etc.

Figure 26:
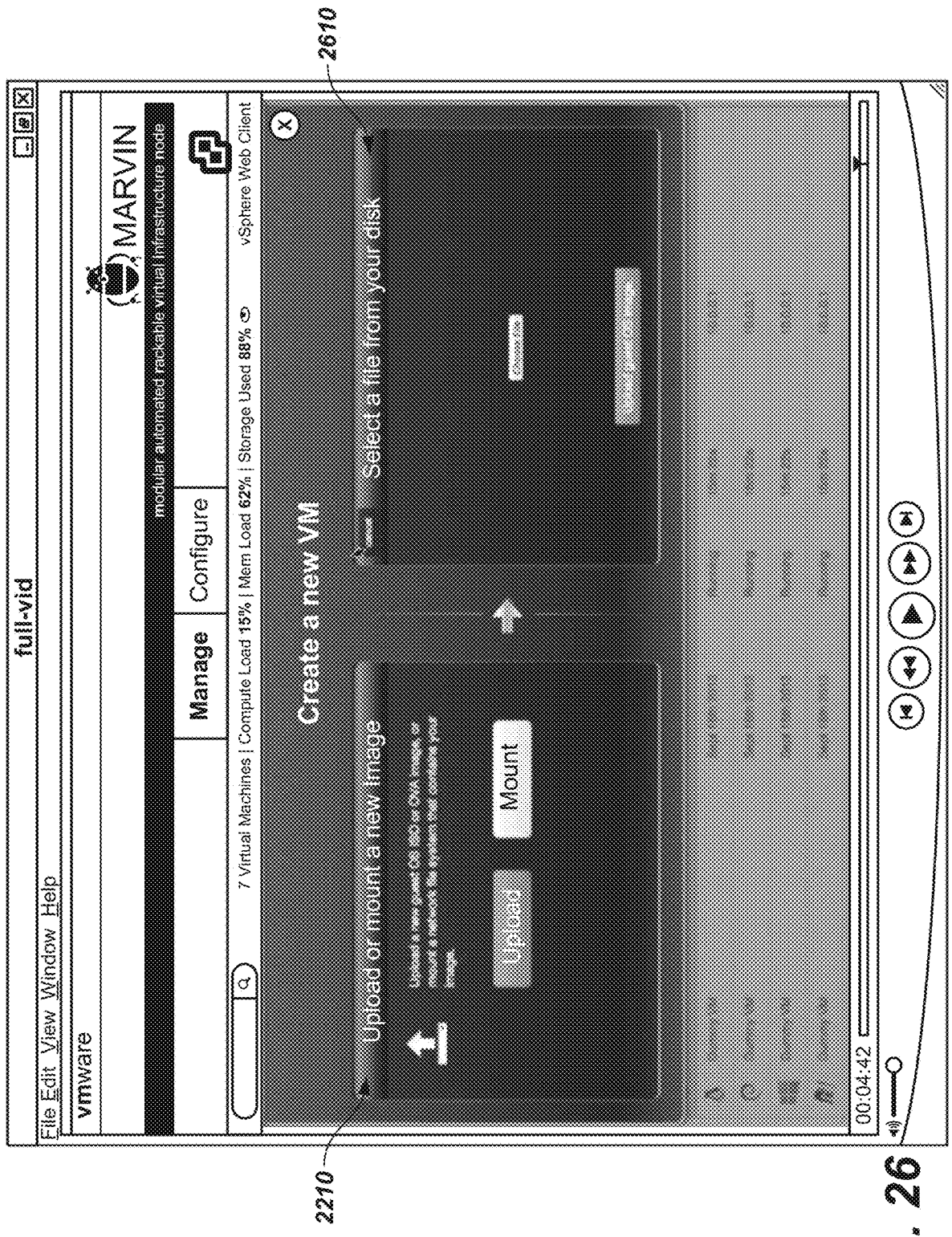

FIG. 26 depicts a GUI showing a user selection for uploading a VM in portion 2210. In response to selecting the upload option, portion 2610 is displayed.

Portion 2610 allows for a user to select a file from a disk. Moreover, portion 2610 allows a user to upload a guest OS image.

FIGS. 27-30 depict a series of GUIs enabling control/management of VMs. It should be appreciated that the functionality of such GUIs allows for propulsive instruction flow. In other words, the functionality of the GUIs enable a user to feel that the actions taken are always progressing forward and not moving backwards.

Figure 27:
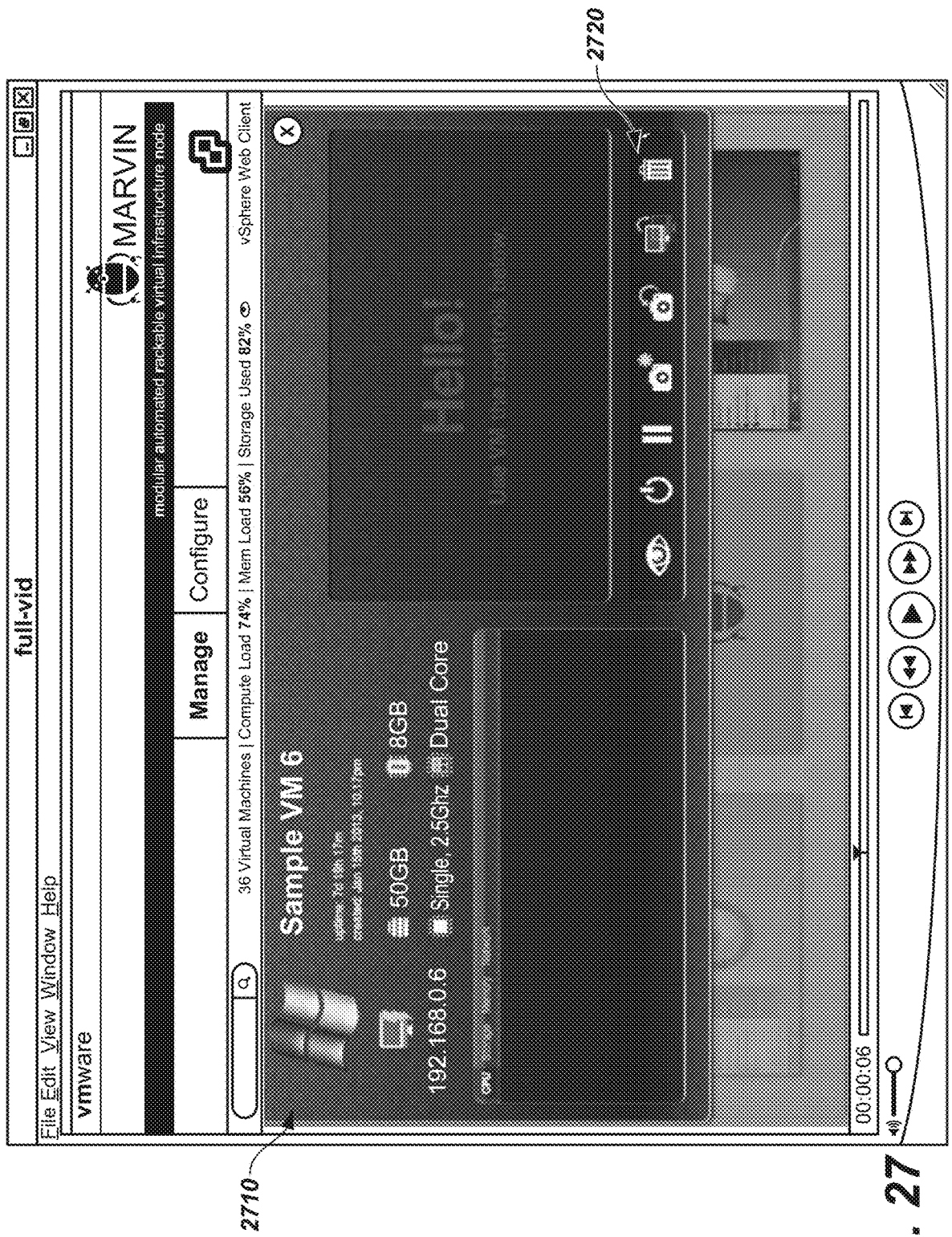

FIG. 27 depicts a GUI 2710 for displaying information associated with a selected VM. For example, when a VM is selected in portion 2010, then GUI 2710 is displayed. GUI includes portion 2720. Portion 2720 includes various actions that may be implemented regarding the control/management of the selected VM. Such actions may include powering on, pause, delete, etc.

Figure 28:
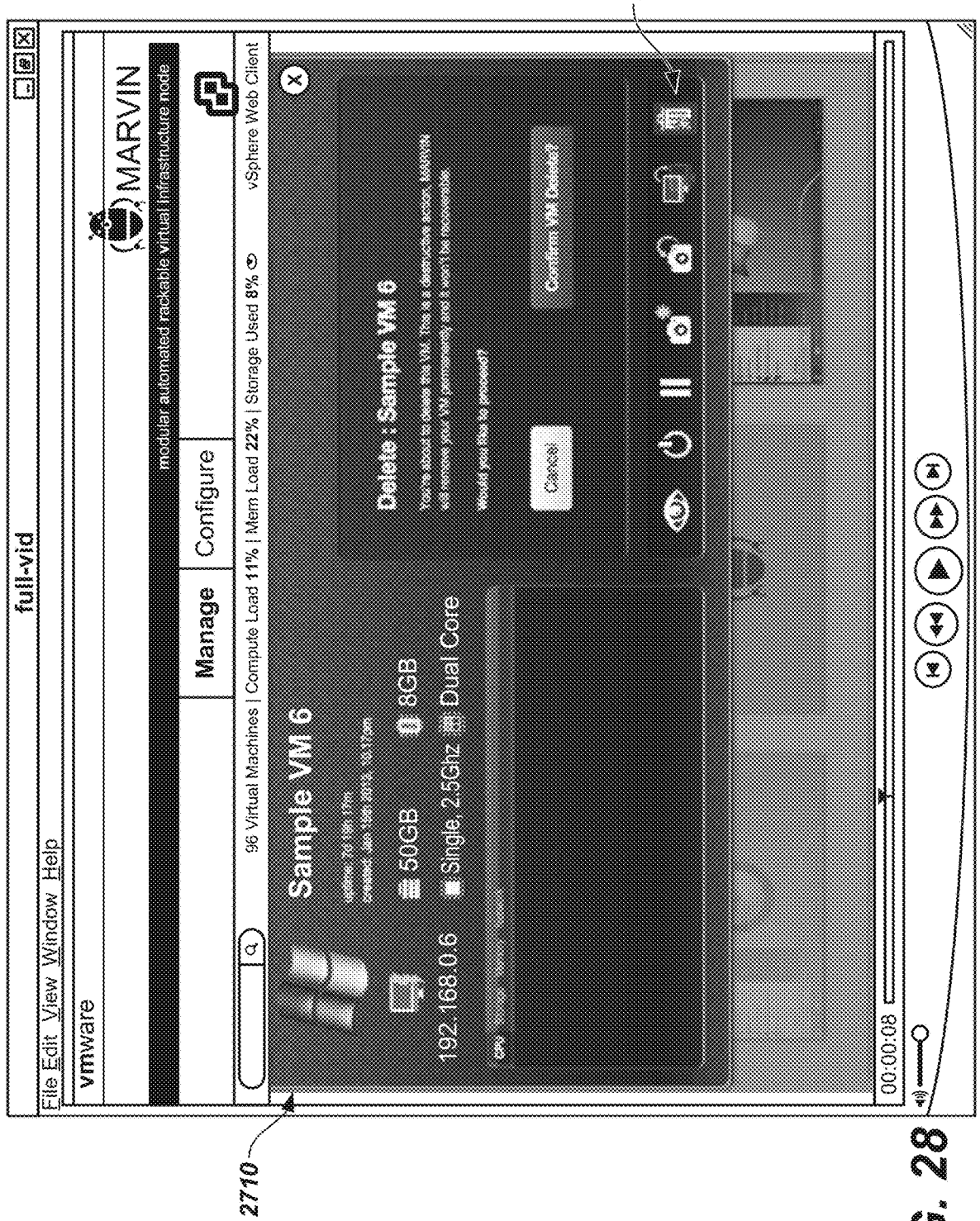

FIG. 28 depicts GUI 2710 when the delete option is selected in portion 2720. As shown, when the delete icon is selected, a warning is displayed. The working confirms the decision whether or not to delete the particular VM.

Figure 29:
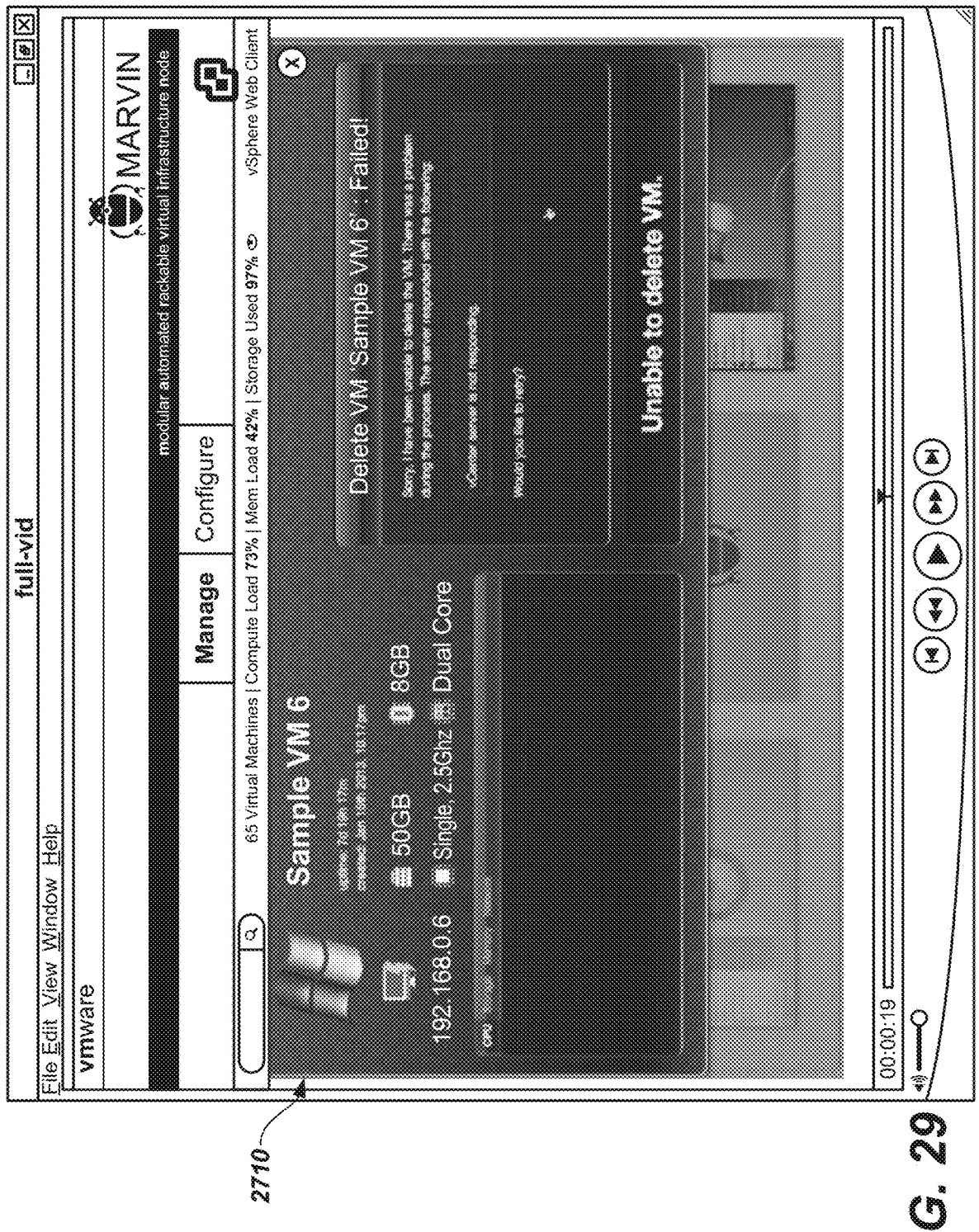

FIG. 29 depicts GUI 2710 when the delete option is selected and the deletion failed. As shown, the deletion of the VM failed because, for example, the vCenter server is not responding. Accordingly, various options are displayed. Such options may include retrying to delete the VM.

Figure 30:
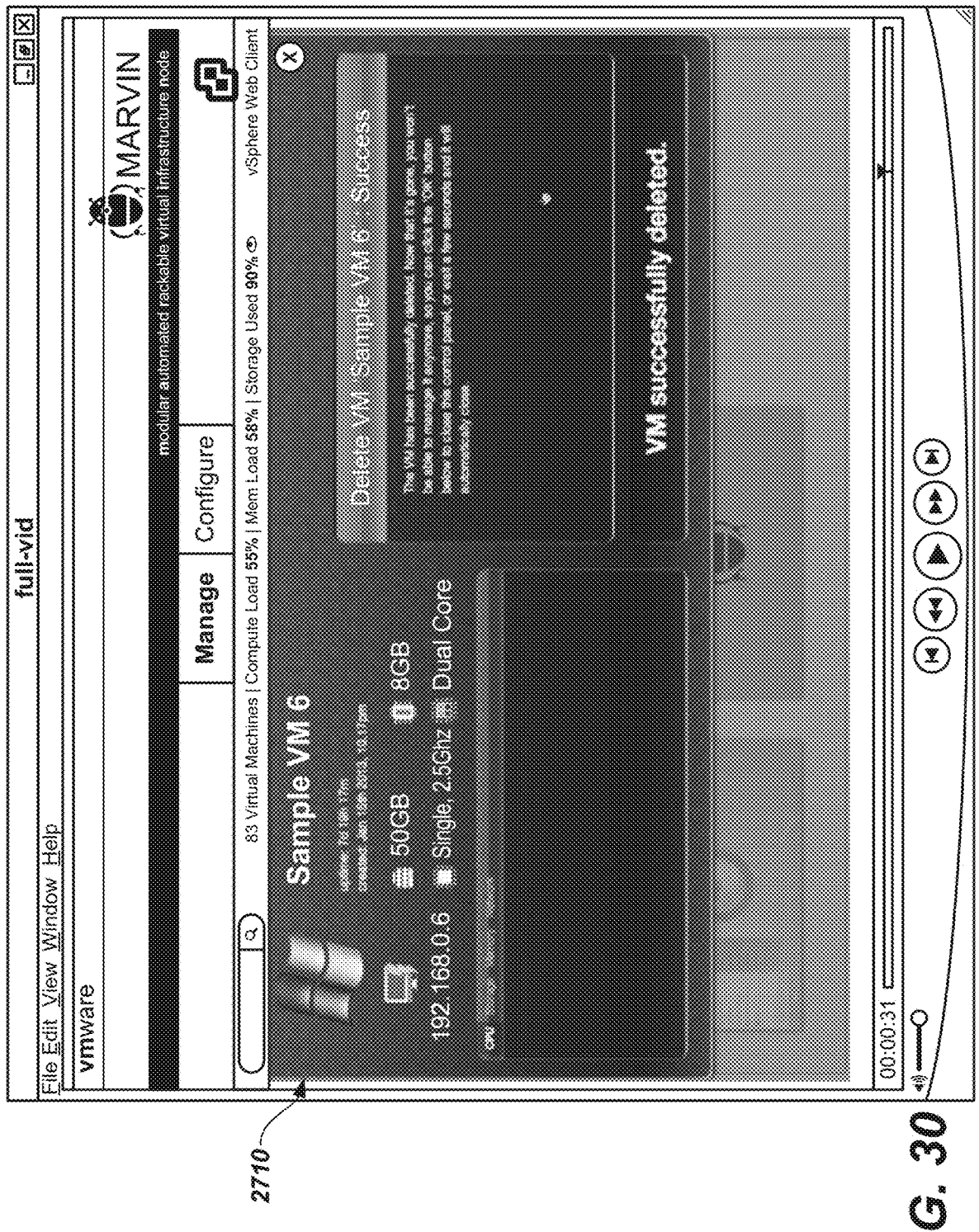

FIG. 30 depicts GUI 2710 when the delete option is selected and the deletion is successful. As shown, the deletion of the VM is successful. Various options may be displayed, such as, pressing an OK button to close the control panel, or waiting and the control panel will automatically close.

Example Methods of Operation

The following discussion sets forth in detail the operation of some example methods of operation of embodiments. With reference to FIGS. 31, 32, 33 and 34, flow diagrams 3100, 3200, 3300, and 3400 illustrate example procedures used by various embodiments. Flow diagrams 3100, 3200, 3300, and 3400 include some procedures that, in various embodiments, are carried out by a processor under the control of computer-readable and computer-executable instructions. In this fashion, procedures described herein and in conjunction with flow diagrams 3100, 3200, 3300, and 3400 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 110 and/or virtualized environment 120). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 3100, 3200, 3300, and 3400 such procedures are examples. That is, embodiments are well suited to performing various other procedures or variations of the procedures recited in flow diagrams 3100, 3200, 3300, and 3400. Likewise, in some embodiments, the procedures in flow diagrams 3100, 3200, 3300, and 3400 may be performed in an order different than presented and/or not all of the procedures described in one or more of these flow diagrams may be performed. It is further appreciated that procedures described in flow diagrams 3100, 3200, 3300, and 3400 may be implemented in hardware, or a combination of hardware with firmware and/or software provided by appliance 300.

Figure 31:
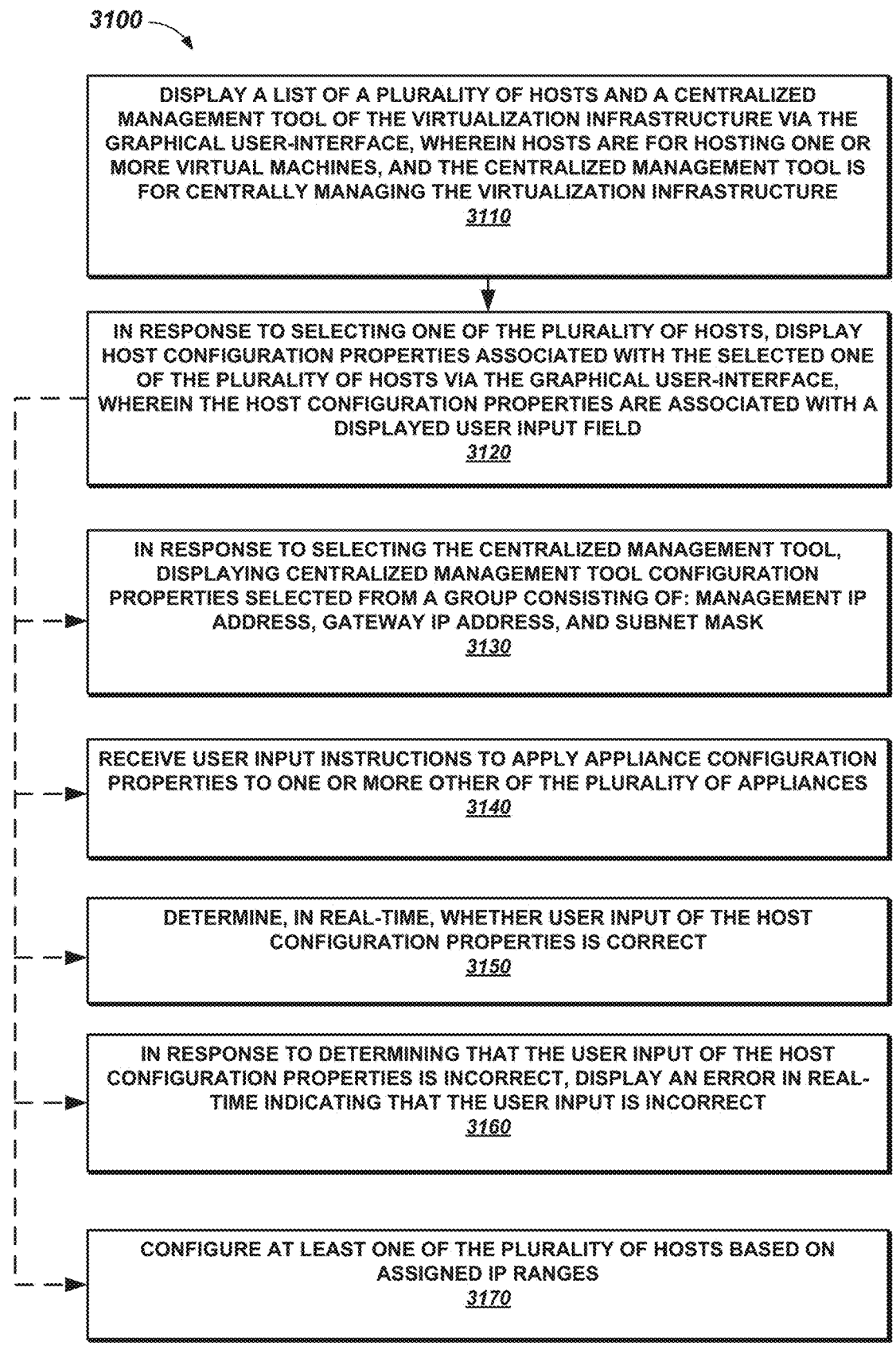
FIG. 31 depicts a flow diagram for a method for configuring appliances in a virtualization infrastructure via a graphical user-interface, according to various embodiments.

FIG. 31 depicts a process flow diagram 3100 for configuring appliances in a virtualization infrastructure via a graphical user-interface, according to various embodiments.

At 3110, a list of a plurality of hosts and a centralized management tool of the virtualization infrastructure is displayed via the graphical user-interface, wherein hosts are for hosting one or more virtual machines, and the centralized management tool is for centrally managing the virtualization infrastructure. For example, FIG. 9 depicts a screenshot of a GUI for configuring an appliance (e.g., appliance 300). Portion 910 depicts a list of hosts (e.g., server nodes 310-1 through 310-n) supported by the appliance. Moreover, portion 910 lists the centralized management tool (i.e., vCenter) for the virtualization infrastructure.

At 3120, in response to selecting one of the plurality of hosts, host configuration properties associated with the selected one of the plurality of hosts are displayed via the graphical user-interface, wherein the host configuration properties are associated with a displayed user input field. For example, referring to FIG. 9, Host 1 is selected in portion 910. Accordingly, portion 912 is displayed that depicts host configuration properties that listed in proximity to a user input field. The user is then able to enter particular host configuration properties in the appropriate input fields.

More specifically, a user enters 172.24.68.86 in the user input field associated with the Management IP address and enters 10.10.0.1 in the user input field associated with the vSAN IP address.

At 3130, in response to selecting the centralized management tool, centralized management tool configuration properties are displayed, the properties are selected from a group consisting of: management IP address, gateway IP address, and subnet mask. For example, FIG. 12 depicts the selection of a vCenter tab in portion 910. In response to the selection of the vCenter tab, portion 1210 is displayed. Portion 1210 depicts the configuration properties for the vCenter. The configuration properties includes, but is not limited to, management IP address, gateway IP address, and subnet mask.

At 3140, user input instructions is received to apply appliance configuration properties to one or more other of the plurality of appliances. For example, referring to FIG. 9, portion 914 depicts the option of "Apply VLAN IDs to all hosts" being selected. As such, the VLAN IDs entered with respect to Host 1 are also applied to other hosts (e.g., Hosts 2, 3 and 4).

At 3150, user input of the host configuration properties is determined, in real-time, if it is correct. For example, if an IP address is entered that is not conflicting with other know IP addresses, then it is determined that the entered IP address is correct. As such, no error or warnings are displayed and the configuration process is able to continue.

At 3160, in response to determining that the user input of the host configuration properties is incorrect, an error is displayed in real-time indicating that the user input is incorrect. For example, referring to FIG. 10, portion 1012 displays an error message that indicates that the entered IP address for vMotion IP on Host 1 has a conflict. The error message is displayed in real-time and the configuration process is halted until the conflict is resolved.

At 3170, at least one of the plurality of hosts is configured based on assigned IP ranges. For example, referring to FIG. 9, Host 3 is selected in portion 910 such that Host 3 is enabled to be configured. Host 3 is assigned predefined IP ranges (or IP pools) for each network. A range can be defined for a subnet (e.g., 10.0.0.1-10.0.0.254). This range can be given a name and then individual or multiple hosts then use that range. Then enables one or more nodes to be added into the cluster without individual configuration.

It is noted that any of the procedures, stated above, regarding flow diagram 3100 may be implemented in hardware, or a combination of hardware with firmware and/or software. For example, any of the procedures are implemented by a processor(s) of a virtualized environment and/or a computing environment.

Figure 32:
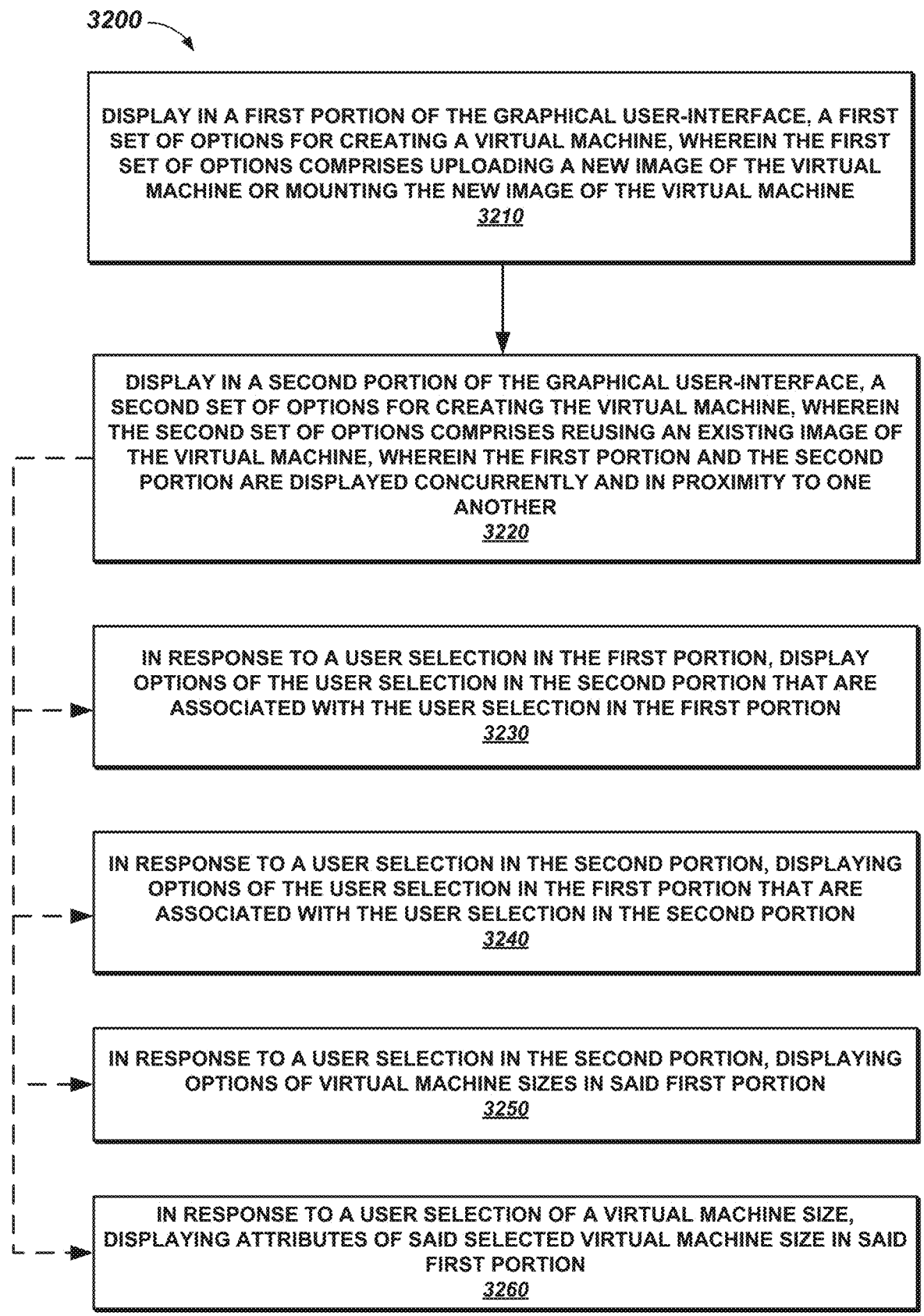
FIG. 32 depicts a flow diagram for a method for creating a virtual machine in a virtualization infrastructure via a graphical user-interface, according to various embodiments.

FIG. 32 depicts a process flow diagram 3200 for creating a virtual machine in a virtualization infrastructure via a graphical user-interface, according to various embodiments.

At 3210, a first set of options for creating a virtual machine are displayed in a first portion of the graphical user-interface, wherein the first set of options comprises uploading a new image of the virtual machine or mounting the new image of the virtual machine. For example, referring to FIG. 22, portion 2210 includes the option of uploading or mounting a new image for creating a new virtual machine.

At 3220, a second set of options for creating the virtual machine are displayed in a second portion of the graphical user-interface, wherein the second set of options comprises reusing an existing image of the virtual machine, wherein the first portion and the second portion are displayed concurrently and in proximity to one another. For example, portion 2220 includes the option of reusing an existing image of a virtual machine. The existing image may be associated with various operating systems (e.g., Microsoft Windows 7, Debian 7.0, FreeBSD 9.1, Microsoft Windows 8, etc.).

At 3230, in response to a user selection in the first portion, options of the user selection are displayed in the second portion that are associated with the user selection in the first portion. For example, referring to FIG. 26, a user selects the "Upload" button in portion 2210. In response to the selection, options associated with the user selection are displayed in portion 2610. In this example, the options displayed in portion 2610 are "Select a file from your disk."

At 3240, in response to a user selection in the second portion, options of the user selection are displayed in the first portion that are associated with the user selection in the second portion. For example, referring to FIG. 23, a user selects reusing an existing image associated with "FreeBSD 9.1" in portion 2220. In response to the selection, options associated with selecting "FreeBSD 9.1" in portion 2220, the size of virtual machine is displayed in portion 2310.

At 3250, in response to a user selection in the second portion, options of virtual machine sizes are displayed in the first portion. For example, in FIG. 23, portion 2310 depicts the option of selecting a small, medium or large virtual machine.

At 3260, in response to a user selection of a virtual machine size, attributes of the selected virtual machine size are displayed in the first portion. For example, in FIG. 23, the large virtual machine is selected in portion 2310. As a result, the attributes of a large virtual machine are also depicted in portion 2310. The attributes include, but are not limited to, CPU attributes, memory attributes and storage attributes.

It is noted that any of the procedures, stated above, regarding flow diagram 3200 may be implemented in hardware, or a combination of hardware with firmware and/or software. For example, any of the procedures are implemented by a processor(s) of a virtualized environment and/or a computing environment.

Figure 33:
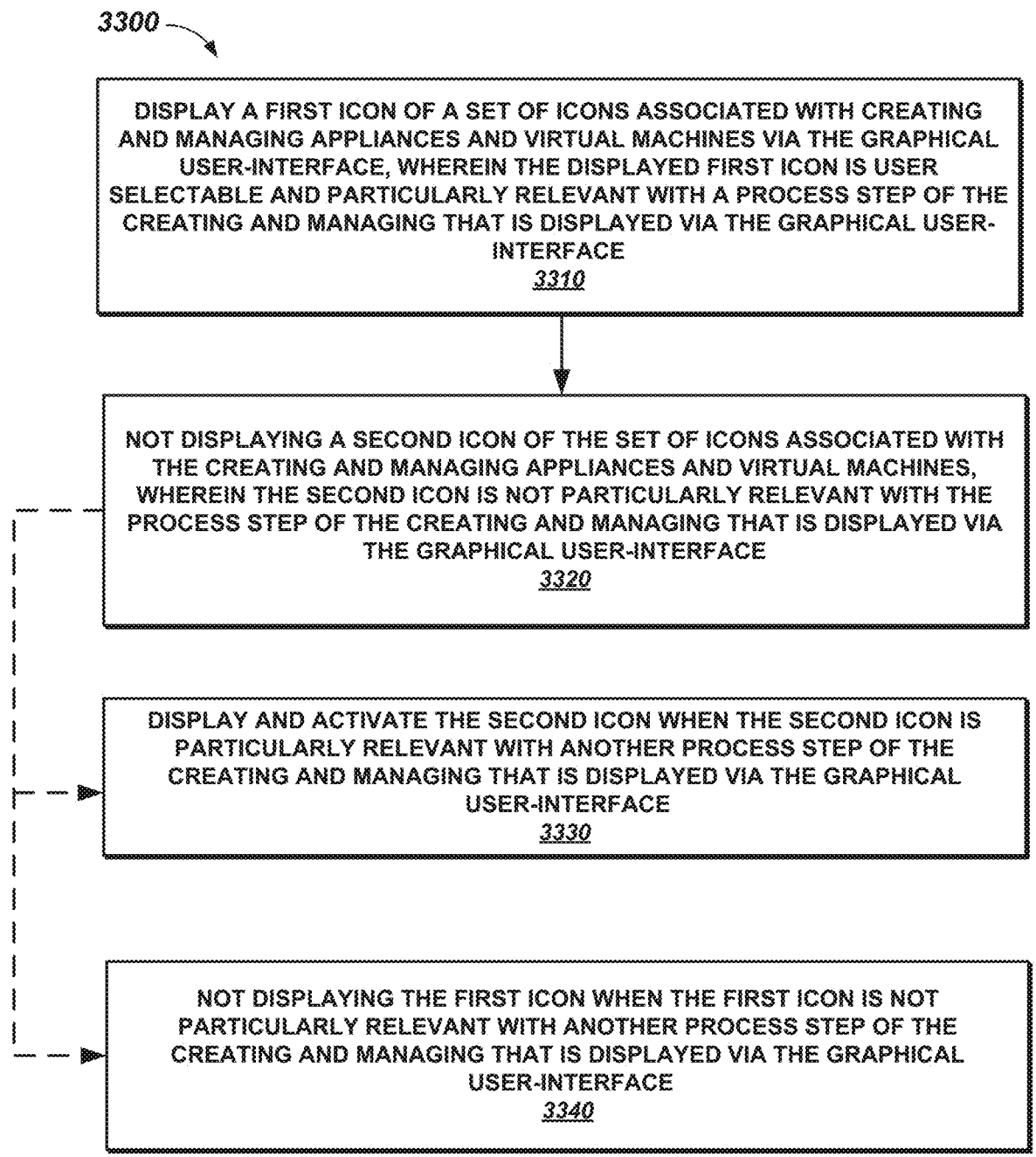
FIG. 33 depicts a flow diagram for a method for creating and managing appliances and virtual machines via a graphical user-interface, according to various embodiments.

FIG. 33 depicts a process flow diagram 3300 for creating and managing appliances and virtual machines via a graphical user-interface, according to various embodiments.

At 3310, a first icon of a set of icons associated with creating and managing appliances and virtual machines are displayed via the graphical user-interface, wherein the displayed first icon is user selectable and particularly relevant with a process step of the creating and managing that is displayed via the graphical user-interface. For example, referring to FIG. 20, portion 2012 depicts a set of icons for each virtual machine listed. The icons may be associated with various actions such as but not limited to power on, pause, view, etc. Portion 2014 depicts five separate icons associated with a virtual machine (i.e., Mornay's desktop). In portion 2014, each of the five separate icons are displayed and active because the actions associated with each icon are relevant while the GUI is displayed to the user.

At 3320, not displaying a second icon of the set of icons associated with the creating and managing appliances and virtual machines, wherein the second icon is not particularly relevant with the process step of the creating and managing that is displayed via the graphical user-interface. For example, portion 2016 depicts three separate icons associated with a virtual machine (e.g., Dev Sandbox). Two of the icons of the set of five icons are not displayed (e.g., pause) because the virtual machine is in a suspended state and pause icon is not relevant to the particular virtual machine at that moment.

At 3330, display and activate the second icon when the second icon is particularly relevant with another process step of the creating and managing that is displayed via the graphical user-interface. For example, in portion 2016, if the virtual machine was not suspended, then the pause icon may be displayed in portion 2016 because the pause icon would be relevant to the virtual machine while running.

At 3340, not displaying the first icon when the first icon is not particularly relevant with another process step of the creating and managing that is displayed via the graphical user-interface. For example, in portion 2014, if the virtual machine was in a suspended state, then the pause icon would not be displayed because the pause functionality would not be relevant to the virtual machine at that moment.

It is noted that any of the procedures, stated above, regarding flow diagram 3300 may be implemented in hardware, or a combination of hardware with firmware and/or software. For example, any of the procedures are implemented by a processor(s) of a virtualized environment and/or a computing environment.

The various embodiments described herein may be practiced with other computer system configurations including hand-held devices, microprocessor systems, microprocessor-based or programmable consumer electronics, minicomputers, mainframe computers, and the like.

Figure 34:
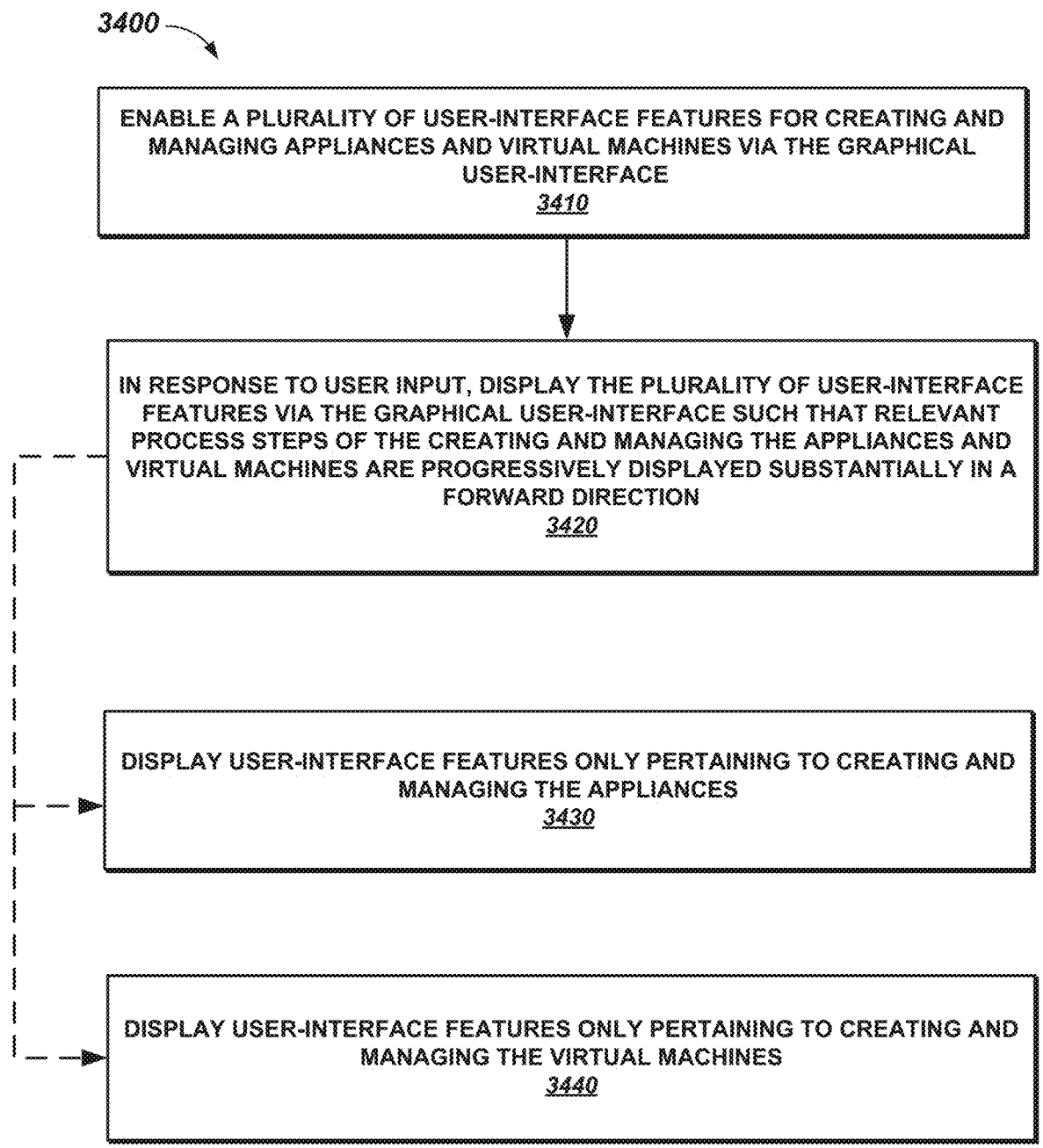
FIG. 34 depicts a flow diagram for a method for creating and managing appliances and virtual machines via a graphical user-interface, according to various embodiments.

FIG. 34 depicts a process flow diagram 3400 for creating and managing appliances and virtual machines via a graphical user-interface, according to various embodiments.

At 3410, a plurality of user-interface features are enabled for creating and managing appliances and virtual machines via the graphical user-interface. For example, GUI module 326 includes instructions to enable a GUI that includes features for creating and managing appliances and virtual machines. The various features are depicted in at least FIGS. 8-30.

At 3420, in response to user input, the plurality of user-interface features are via the graphical user-interface such that relevant process steps of said creating and managing said appliances and virtual machines are progressively displayed substantially in a forward direction. For example, as a user progresses through the method steps of creating and managing an appliance as depicted in FIGS. 8-16, the user progresses through the method steps in a forward direction (e.g., to the user's right).

At 3430, user-interface features only pertaining to creating and managing the appliances are displayed. For example, the GUI as depicted in FIGS. 8-17 pertain to creating and managing of hosts (e.g., servers nodes) in the appliance.

At 3340, user-interface features only pertaining to creating and managing said virtual machines are displayed. For example, the GUI as depicted in FIGS. 18-30 pertains to creating and managing virtual machines hosted by the appliance.

It is noted that any of the procedures, stated above, regarding flow diagram 3400 may be implemented in hardware, or a combination of hardware with firmware and/or software. For example, any of the procedures are implemented by a processor(s) of a virtualized environment and/or a computing environment.

Examples of a Business Model

Figure 35:
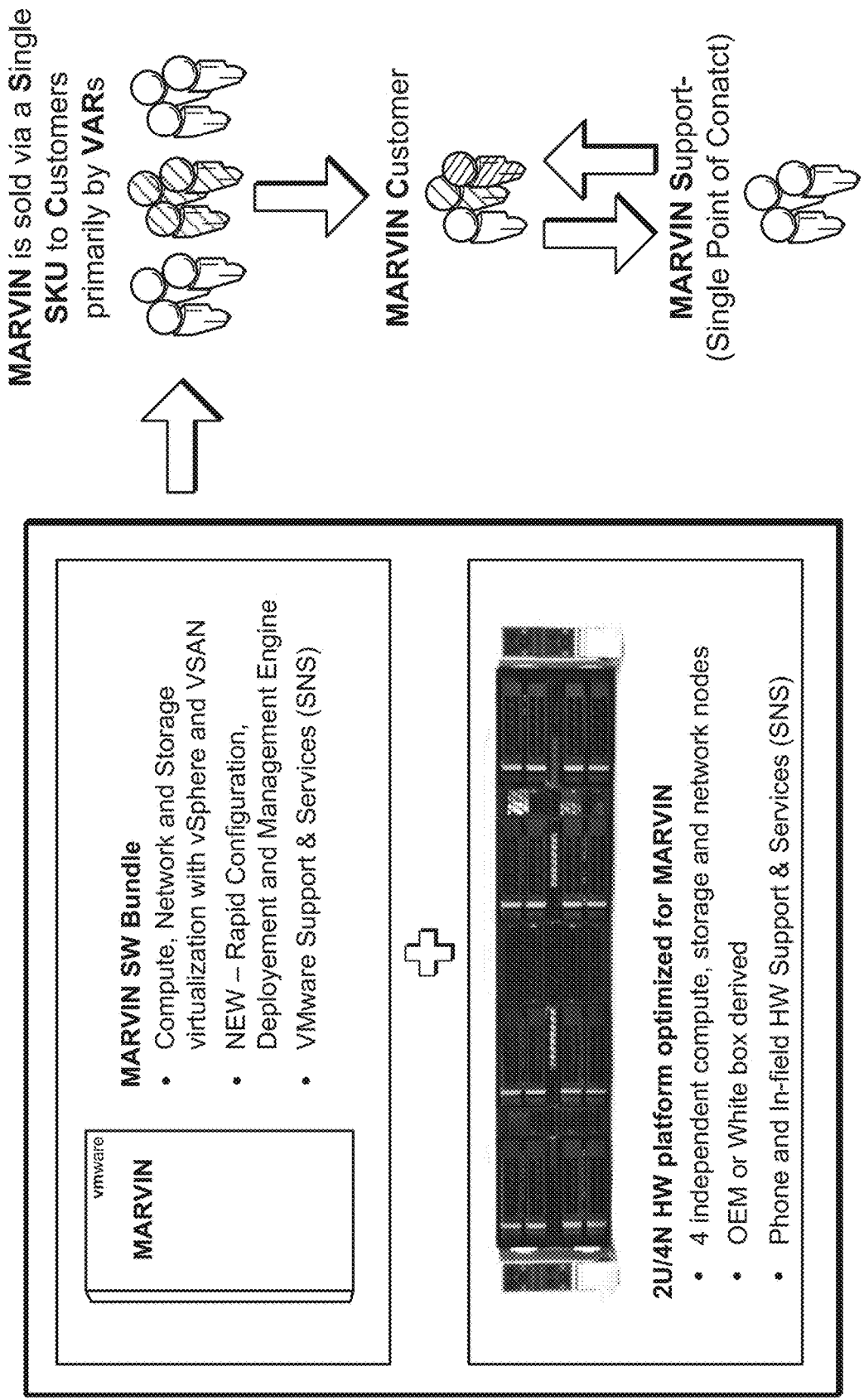
FIG. 35 depicts a flow diagram for a method for creating and managing appliances and virtual machines via a graphical user-interface, according to various embodiments.

FIGS. 35 and 36 each depict a flow diagram pertaining to a business model of selling and support of appliances. FIG. 35, for example, depicts, an appliance sold as a single SKU and the customer receiving subsequent support at single point of contact. FIG. 36, for example, depicts the channel and direct sales from partner/distributor to a customer.

The various embodiments described herein may be practiced with other computer system configurations including hand-held devices, microprocessor systems, microprocessor-based or programmable consumer electronics, minicomputers, mainframe computers, and the like.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

The invention claimed is:

1. A computer-implemented method for creating a virtual machine in a hyper-converged computing device supporting a virtualization infrastructure via a graphical user-interface, comprising:

displaying in a first portion of said graphical user-interface, a first set of options for creating a virtual machine, wherein said first set of options comprises:

uploading a new image of said virtual machine or mounting said new image of said virtual machine; and displaying in a second portion of said graphical user-interface, a second set of options for creating said virtual machine, wherein said second set of options comprises:

reusing an existing image of said virtual machine, wherein said first portion and said second portion are displayed concurrently and in proximity to one another;

wherein said hyper-converged computing device comprises:

a plurality of independent server nodes each comprising: a central processing unit (CPU), memory, and storage, wherein said plurality of independent server nodes is configured to deploy and host a plurality of virtual machines;

a software module comprising a centralized management tool for providing central management of said plurality of virtual machines, said software module installed within at least one independent server node of said plurality of independent server nodes, said software module comprising a hypervisor supporting a virtual machine execution space for instantiating a virtual machine within said at least one independent server node; and a single enclosure comprising said plurality of independent server nodes.

2. The computer-implemented method of claim 1, further comprising:

in response to a user selection in said first portion, displaying options of said user selection in said second portion that are associated with said user selection in said first portion.

3. The computer-implemented method of claim 1, further comprising:

in response to a user selection in said second portion, displaying options of said user selection in said first portion that are associated with said user selection in said second portion.

4. The computer-implemented method of claim 1, further comprising:

in response to a user selection in said second portion, displaying options of virtual machine sizes in said first portion.

5. The computer-implemented method of claim 4, further comprising:

in response to a user selection of a virtual machine size, displaying attributes of said selected virtual machine size in said first portion.

6. A computer-implemented method for creating and managing appliances and virtual machines via a graphical user-interface, comprising:

providing central management of said virtual machines of said appliances at a centralized management tool of said appliances, said centralized management tool providing a graphical user interface for creating and managing appliances and virtual machines via said graphical user-interface, wherein said appliances comprise a plurality of hosts for hosting said virtual machines, wherein said central management tool is installed within at least one host of said plurality of hosts for supporting a virtual machine execution space of the plurality of hosts such that the at least one host can execute a virtual machine within the virtual machine execution space, wherein said appliances are pre-configured hyper-converged computing devices comprising said plurality of hosts within a single enclosure, said plurality of hosts each comprising a central processing unit (CPU), memory, and storage;

enabling a plurality of user-interface features for creating and managing appliances and virtual machines via said graphical user-interface; and in response to user input, displaying said plurality of user-interface features via said graphical user-interface such that relevant process steps of said creating and managing said appliances and virtual machines are progressively displayed substantially in a forward direction.

7. The computer-implemented method of claim 6, further comprising:

displaying user-interface features only pertaining to creating and managing said appliances.

8. The computer-implemented method of claim 6, further comprising:

displaying user-interface features only pertaining to creating and managing said virtual machines.

9. The computer-implemented method of claim 6, wherein said relevant process steps of said creating and managing said appliances and virtual machines are progressively displayed only in said forward direction.

* * * * *